(12) United States Patent
Li et al.

(10) Patent No.: US 8,957,625 B2
(45) Date of Patent: Feb. 17, 2015

(54) SYSTEMS AND METHODS FOR CELL BALANCING

(71) Applicant: O2Micro Inc., Santa Clara, CA (US)

(72) Inventors: Guoxing Li, Sunnyvale, CA (US); Wei Zhang, Shanghai (CN); Songtao Chen, Shenzhen (CN); Chutao Zhang, Shenzhen (CN)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 13/713,944

(22) Filed: Dec. 13, 2012

(65) Prior Publication Data

US 2013/0099723 A1   Apr. 25, 2013

Related U.S. Application Data

(63) Continuation of application No. 13/100,451, filed on May 4, 2011, now Pat. No. 8,339,100, which is a continuation-in-part of application No. 12/891,784, filed on Sep. 27, 2010, now Pat. No. 8,164,305.

(30) Foreign Application Priority Data

Sep. 29, 2009  (CN) .......................... 2009 1 0178565

(51) Int. Cl.
  *H02J 7/00* (2006.01)
  *H01M 10/42* (2006.01)
  *H01M 10/48* (2006.01)

(52) U.S. Cl.
  CPC ................. *H02J 7/00* (2013.01); *H01M 10/42* (2013.01); *H01M 10/4207* (2013.01); *H01M 10/482* (2013.01); *H02J 7/0016* (2013.01); *Y02T 10/7055* (2013.01)
  USPC .......... 320/103; 320/118; 320/119; 320/120; 320/121

(58) Field of Classification Search
  USPC ........................................ 320/103, 118–120
  See application file for complete search history.

(56) References Cited

U.S. PATENT DOCUMENTS

| | | | |
|---|---|---|---|
| 5,828,201 A * | 10/1998 | Hoffman et al. | ............... 320/104 |
| 6,140,800 A | 10/2000 | Peterson | |
| 6,356,055 B1 | 3/2002 | Lin et al. | |
| 6,538,414 B1 | 3/2003 | Tsuruga et al. | |
| 6,586,910 B2 | 7/2003 | Matsui et al. | |
| 6,670,789 B2 | 12/2003 | Anzawa et al. | |
| 7,049,791 B2 | 5/2006 | Lin et al. | |
| 7,061,207 B2 | 6/2006 | Patel et al. | |
| 7,400,114 B2 * | 7/2008 | Anzawa et al. | ............... 320/119 |
| 7,564,218 B2 | 7/2009 | Ooishi et al. | |

(Continued)

FOREIGN PATENT DOCUMENTS

| | | |
|---|---|---|
| CN | 1409884 A | 4/2003 |
| CN | 101606299 A | 12/2009 |

(Continued)

*Primary Examiner* — Richard Isla Rodas
*Assistant Examiner* — Nathaniel Pelton

(57) ABSTRACT

A method for balancing multiple battery cells which are grouped into multiple battery modules includes: obtaining cell parameters of the battery cells, respectively; calculating an average cell parameter for each of the battery modules according to the cell parameters; identifying a donator module and a receiver module from the battery modules based upon the average cell parameter; and transferring energy from the donator module to the receiver module to balance the battery cells.

20 Claims, 18 Drawing Sheets

(56) References Cited

U.S. PATENT DOCUMENTS

| | | | |
|---|---|---|---|
| 7,928,735 B2 | 4/2011 | Huang et al. | |
| 8,120,322 B2 | 2/2012 | Lee et al. | |
| 8,164,305 B2 | 4/2012 | Zhang et al. | |
| 8,339,100 B2 | 12/2012 | Li et al. | |
| 2004/0150405 A1* | 8/2004 | Burany et al. | 324/426 |
| 2007/0257642 A1 | 11/2007 | Xiao et al. | |
| 2008/0191663 A1 | 8/2008 | Fowler et al. | |
| 2010/0207579 A1* | 8/2010 | Lee et al. | 320/120 |
| 2010/0237830 A1* | 9/2010 | Castelaz et al. | 320/118 |
| 2010/0276998 A1 | 11/2010 | Luo et al. | |

FOREIGN PATENT DOCUMENTS

| | | |
|---|---|---|
| CN | 101282046 B | 9/2010 |
| CN | 101877486 A | 11/2010 |
| CN | 101908775 A | 12/2010 |
| CN | 102035010 A | 4/2011 |
| TW | M319576 U | 9/2007 |
| TW | 200814489 A | 3/2008 |
| TW | M331246 U | 4/2008 |
| TW | 200849766 A | 12/2008 |
| TW | 200926556 A | 6/2009 |
| TW | 200928404 A | 7/2009 |

* cited by examiner

SYSTEMS AND METHODS FOR CELL BALANCING

RELATED APPLICATION

This application is a continuation of U.S. patent application Ser. No. 13/100,451, titled "Systems and Methods for Cell Balancing," filed on May 4, 2011, now U.S. Pat. No. 8,339,100, which itself is a continuation-in-part of U.S. patent application Ser. No. 12/891,784, titled "A Battery Management System with Energy Balance among Multiple Battery Cells", filed on Sep. 27, 2010, now U.S. Pat. No. 8,164,305, which itself claims priority to Chinese Patent Application No. 200910178565.8, filed on Sep. 29, 2009, with the State Intellectual Property Office of the People's Republic of China, all of which are hereby incorporated by reference in their entirety.

BACKGROUND

Nowadays, a battery pack, e.g., a Lithium-Ion battery pack, including multiple battery cells is widely used in many electrical products, e.g., hybrid electric vehicle and electric vehicle applications. In general, the battery cells degrade gradually and slowly, and the battery cells degrade differently from each other. As a result, voltages and states of charge (SOC) of the battery cells may be different from each other after multiple charging and discharging cycles, and this difference in degradation leads to unbalances between the battery cells.

More specifically, if the unbalances between the battery cells occur during a charging process, a battery management system may continue to charge the whole battery pack when a battery management system detects a battery cell having the lowest charge is not yet fully charged. As a result, another battery cell having a higher charge may be over-charged. If the unbalances between the battery cells occur during a discharging process, the battery management system may control the whole battery pack to provide power continuously when the battery management system detects a battery cell having the highest charge is not fully discharged. As a result, another battery cell having a lower charge may be over-discharged. Hence, a battery management system may need to move energy from a cell or group of cells to another cell or group of cells to balance the battery cells.

FIG. 1 shows a block diagram of a conventional battery management system 100. As shown in FIG. 1, a battery pack 102 includes multiple battery cells 102_1-102_M. A transformer in the battery management system 100 includes a primary winding 104 and multiple secondary windings 106_1-106_M having the same number of turns. The primary winding 104 is coupled to a switch 108 in series. Each battery cell 102_K is coupled to a corresponding secondary winding 106_K (K=1, 2, ..., M).

When the switch 108 is turned on, a discharging current $I_{DISCHG}$ flows from the battery pack 102 to the primary winding 104. Energy can be accumulated in a magnetic core of the transformer temporarily. When the switch 108 is turned off, currents $I_1, I_2, I_3, \ldots$ and $I_M$ are respectively induced in the secondary winding 106_1-106_M and flow to the battery cells 102_1-102_M. Thus, the energy stored in the magnetic core can be released to the battery cells 102_1-102_M. The currents $I_1, I_2, I_3, \ldots,$ and $I_M$ are reversely proportional to the voltages of the battery cells 102_1-102_M. Therefore (by way of example), if the voltage of the battery cell 102_1 is lower than the voltage of the battery cell 102_2, the battery cell 102_1 can receive more energy than the battery cell 102_2. Since each battery cell 102_K (1≤K≤M) receives energy released from the magnetic core, e.g., even the battery cell having a maximum voltage can receive a corresponding current, the balancing efficiency of the battery management system 100 may be degraded.

SUMMARY

In one embodiment, a method for balancing multiple battery cells which are grouped into multiple battery modules includes: obtaining cell parameters of the battery cells, respectively; calculating an average cell parameter for each of the battery modules according to the cell parameters; identifying a donator module and a receiver module from the battery modules based upon the average cell parameter; and transferring energy from the donator module to the receiver module to balance the battery cells.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Figure 1:
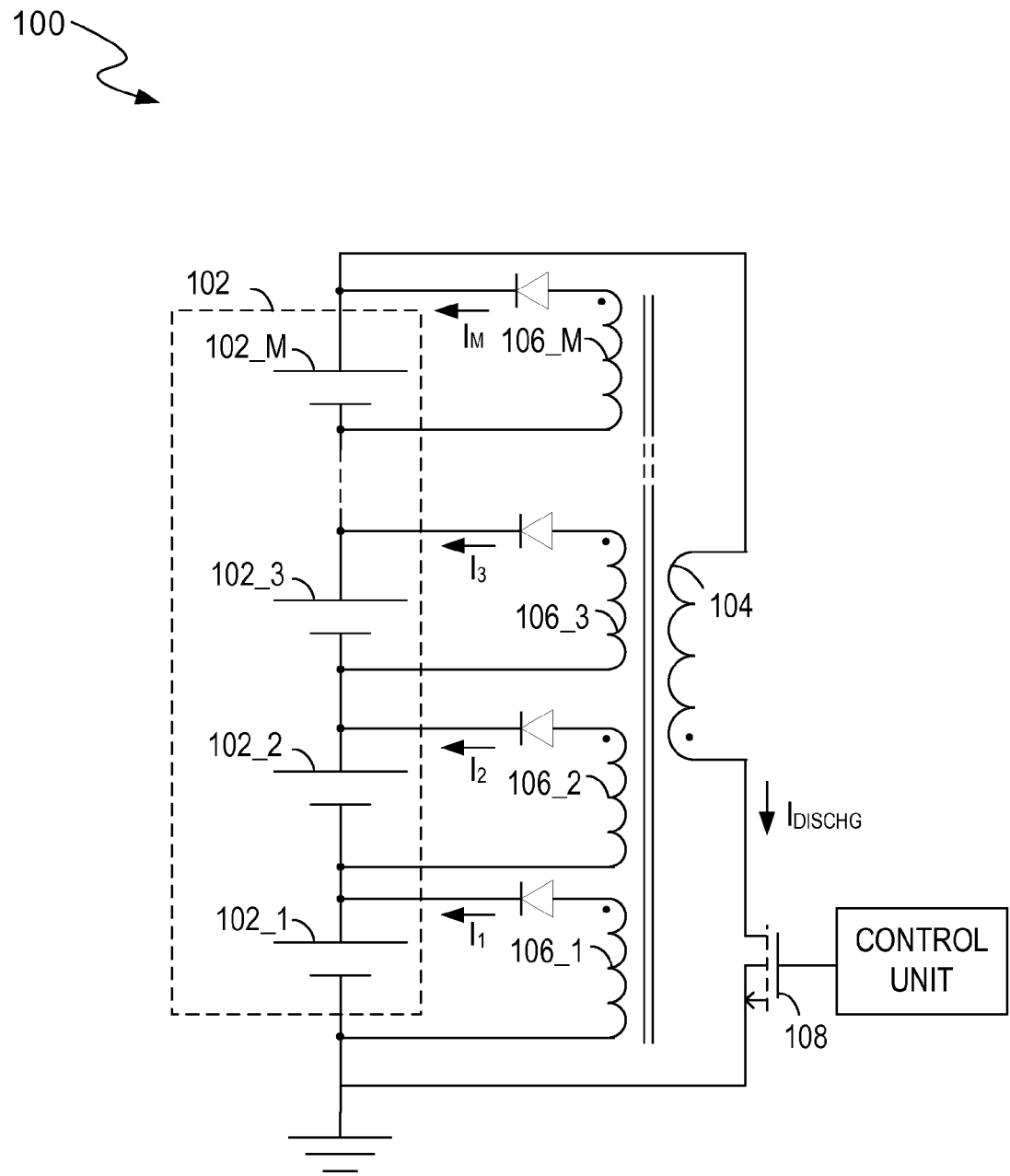
FIG. 1 shows a block diagram of a conventional battery management system.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

Embodiments described herein may be discussed in the general context of machine-executable (e.g., computer-executable) instructions residing on some form of machine-readable (e.g., computer-readable) storage medium, such as program modules, executed by one or more computers or other devices. By way of example, and not limitation, machine-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 2:
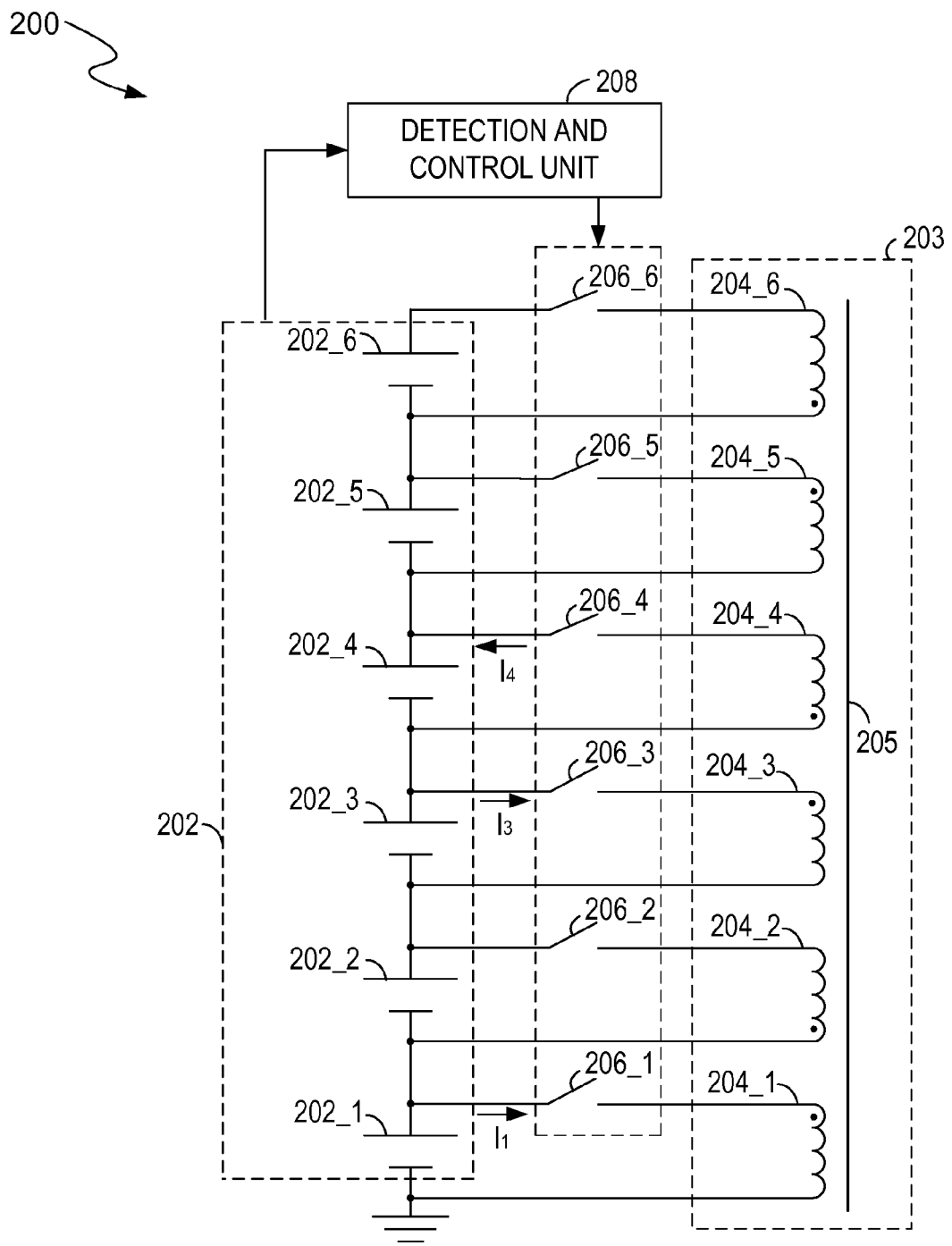
FIG. 2 illustrates a block diagram of a battery management system according to one embodiment of the present invention.

FIG. 2 illustrates a block diagram of a battery management system 200 according to one embodiment of the present invention. The battery management system 200 can move energy between series-coupled battery cells 202_1-202_6 in a battery pack 202 to balance the battery cells 202_1-202_6. The number of the battery cells is set to 6 (as shown in FIG. 2) for illustrative purpose herein. However, the number of the battery cells in the battery pack 220 may vary and the battery pack 202 may include other number of the battery cells.

In one embodiment, a magnetic device 203 includes a magnetic core 205 and multiple windings 204_1-204_6 wiring around the magnetic core 205. The windings 204_1-204_6 are coupled to the battery cells 202_1-202_6 via switches 206_1-206_6 respectively. For example, the winding 204_1 is coupled to the battery cell 202_1 via the switch 206_1. In one embodiment, the windings 204_1-204_6 have the same turns. As shown in FIG. 2, positive terminals of the battery cells 202_1, 202_3 and 202_5 are connected to polarity marks of the windings 204_1, 204_3 and 204_5 respectively, and negative terminals of the battery cells 202_2, 202_4 and 202_6 are connected to polarity marks of the windings 204_2, 204_4 and 204_6 respectively. The polarity marks of the windings 204_1-204_6 are shown as dots at one end of the windings 204_1-204_6. In the following description, the terminals of the battery cells 202_1-202_6, which are connected to the polarity marks of the corresponding windings 204_1-204_6, will be described as dot-connected terminals.

When a first switch and a second switch respectively coupled to a first and a second battery cells of the battery cells 202_1-202_6 are turned on alternatively, a first current, which flows through the first battery cell and a first winding coupled to the first battery cell, and a second current, which flows through the second battery cell and a second winding coupled to the second battery cell, can be conducted alternatively. The first winding functions as a primary winding and the second winding functions as a secondary winding. If the dot-connected terminals of the first and second battery cells have the same polarities, the second current, generated based on the first current, can flow through second winding in the same direction as the first current flowing through the first winding. Otherwise, second current can flow through the second winding in a different direction from the first current flowing through the first winding.

Accordingly, if the dot-connected terminals of the first and second battery cells have different polarities, when the first current flow from the positive terminal to the negative terminal of the first battery cell, the second current will flow from the negative terminal to the positive terminal of the second battery cell. Thus the second battery cell can by charged by the second current and energy can be transferred from the first battery cell to the second battery cell. On the contrary, if the dot-connected terminals of the first and second battery cells have the same polarities, when the first current flow from the positive terminal to the negative terminal of the first battery cell, the second current will also flow from the positive terminal to the negative terminal of the second battery cell. Thus the second battery cell is not charged by the second current.

In an alternative embodiment, the battery management system 200 can have other connections between the battery cells 202_1-202_6 and the windings 204_1-204_6 and is not limited to the connections shown in FIG. 2. For example, the positive terminals of the battery cells 202_1 and 202_2 can be coupled to the polarity marks of the winding 204_1 and 204_2 respectively. The negative terminals of the battery cells 202_3-202_6 can be coupled to the polarity marks of the windings 204_3-204_6.

Furthermore, a detection and control unit 208 detects state parameters, such as voltages of the battery cells 202_1-202_6, and controls the switches 206_1-206_6 according to the detecting results. In one embodiment, the detection and control unit 208 selects a first battery cell which state parameter has a first value and a second battery cell which state parameter has a second value from the battery pack 202. The first value is greater than the second value. Subsequently, the detection and control unit 208 turns on and off the corresponding switches to transfer energy between the first battery cell and the second battery cell via the magnetic device 203.

More specifically, during a charging process, the detection and control unit 208 detects voltages of the battery cells 202_1-202_6 and calculates a difference between a maximal value $V_{1H}$ and a minimal value $V_{1L}$ among the voltages of the battery cells 202_1-202_6. If the difference between the maximal value $V_{1H}$ and the minimal value $V_{1L}$ is higher than a first threshold, e.g., 0.5V, abnormal condition may be present in the battery pack 202. Upon detection of voltage difference being higher than the first threshold value, the battery management system 200 will check the availability of the battery pack 202.

If the difference between the maximal value $V_{1H}$ and the minimal value $V_{1L}$ is lower than a second threshold, e.g., 50 mV, the battery cells 202_1-202_6 are considered to be well balanced. The threshold values may be set according to each characteristics of each battery technology.

If the difference between the maximal value $V_{1H}$ and the minimal value $V_{1L}$ is lower than the first threshold and higher than the second threshold, an unbalance between the battery cells 202_1-202_6 may present in the battery pack 202. The detection and control unit 200 can move energy from a cell or group of cells to another cell or group of cells to balance the battery cells 202_1-202_6.

In one embodiment, if the dot-connected terminal of the battery cell having the maximal value $V_H$, e.g., the battery cell 202_1, and the dot-connected terminal of the battery cell having the minimal value $V_L$, e.g., the battery cell 202_4, have different polarities, the detection and control unit 200 can move energy from the battery cell 202_1 to the battery cell 202_4.

Figure 3:
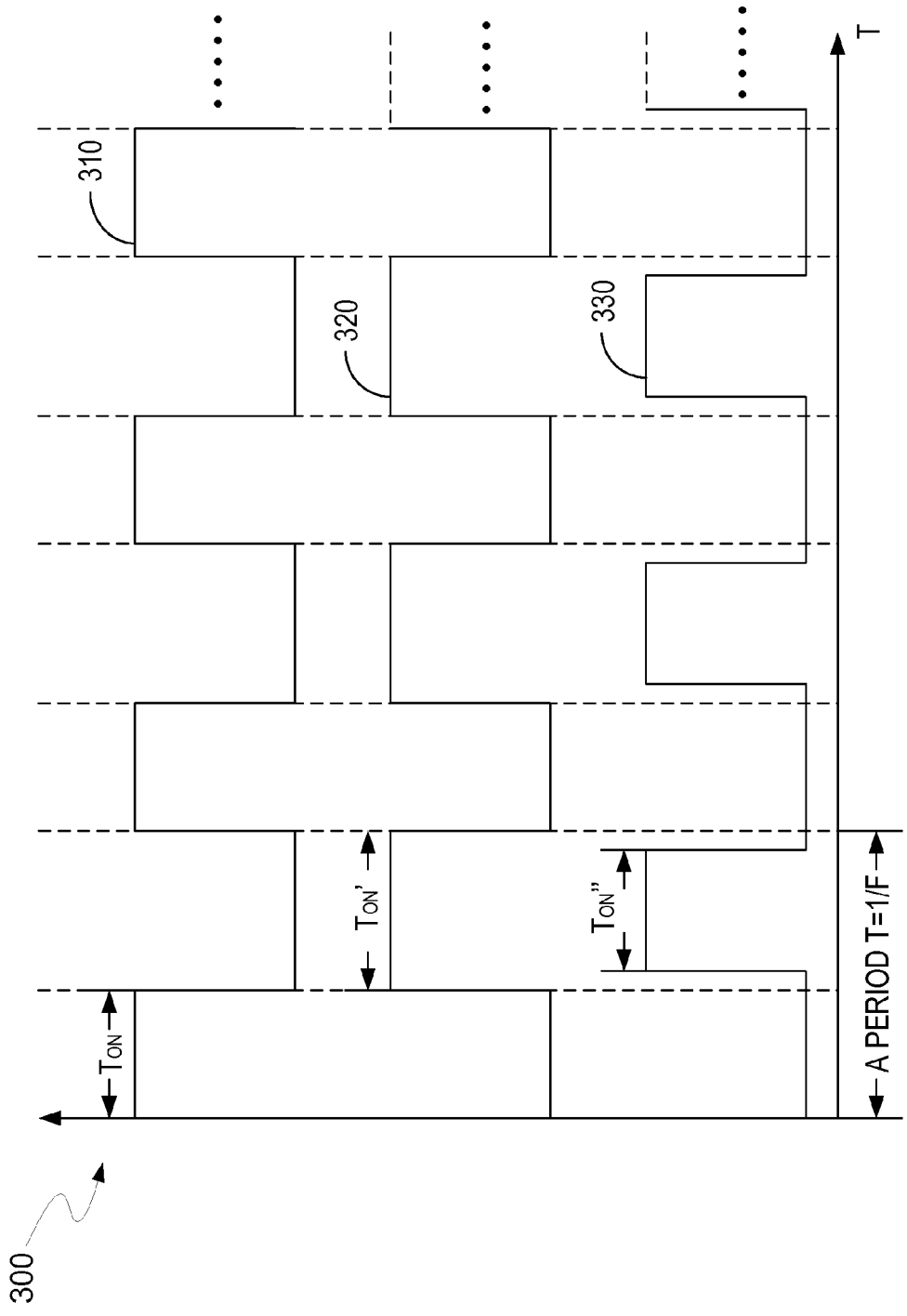
FIG. 3 shows a relationship between a first control signal and a second control signal generated by a detection and control unit of a battery management system according to one embodiment of the present invention.

The detection and control unit 208 generates a first control signal to the switch 206_1 and generates a second control signal to the switch 206_4 for turning on and off the switches 206_1 and 206_4 alternately. The first and second control signals can be periodic signals. An overlap between a duty cycle of the first control signal and a duty cycle of the second control signal during a period T is approximately zero. A relationship between the first control signal and the second control signal can be shown in FIG. 3. In FIG. 3, waveform 310 indicates the first control signal having a frequency $F_1$ with a duty cycle $D_1$, waveform 320 indicates the second control signal having a frequency equal to $F_1$ with a duty cycle $D_2$, and waveform 330 indicates the second control signal having a frequency equal to $F_1$ with a duty cycle $D_2'$. The duty cycle $D_2$ and the duty cycle $D_2'$ can be given by equation (1).

$$\begin{cases} D_2 = (1 - D_1) \\ D_2' < (1 - D_1) \end{cases} \quad (1)$$

Under the control of the first and second control signals, the switch 206_1 and the switch 206_4 can be turned on alternately.

When the switch 206_1 is turned on in response to the first control signal, the switch 206_4 is turned off in response to the second control signal. A current $I_1$ flows from the battery cell 202_1 to the winding 204_1. The current $I_1$ gradually increases and energy of the battery cell 202_1 can be transferred to and accumulated in the magnetic core 205 of the magnetic device 203 in a first period, e.g., $T_{ON}$ as shown in FIG. 3. In one embodiment, the first duration $T_{ON}$ can be given by equation (2).

$$T_{on} = \frac{D_1}{F_1} = \sqrt{2 \times L \times \bar{I}} / \sqrt{V \times F_1} \quad (2)$$

Wherein V represents the voltage of the battery cell 202_1, $\bar{I}$ represents a predetermined average value of the current $I_1$, and L represents an inductance of the winding 204_1, $F_1$ represents the frequency of the first and second control signal. According to equation (2), the duty cycle $D_1$ can be given by equation (3).

$$D_1 = \sqrt{2 \times L \times \bar{I} \times F_1 / V} \quad (3)$$

After the switch 206_1 is turned off in response to the first control signal, the switch 206_4 is turned on in response to the second control signal. The current $I_1$ decreases to approximately zero. A current $I_4$ is induced in the winding 204_4 and flows to the battery cell 202_4 for charging the battery cell 202_4 during a second duration, e.g., $T_{ON}'$ or $T_{ON}''$ shown in FIG. 3. Thus the energy stored in the magnetic core 205 can be released to the battery cell 202_4. Hence, the energy is transferred from the battery cell 202_1 to the battery cell 202_4. Accordingly, the voltage of the battery cell 202_1 is decreased and the voltage of the battery cell 202_4 is increased. The detection and control unit 208 can turn on the switch 206_1 and 206_4 alternately until the difference between the voltage of the battery cell 202_1 and the voltage of the battery cell 202_4 is less than the second threshold.

The detection and control unit 208 turns off the switches 206_2, 206_3, 206_5 and 206_6 during the operation of balancing the battery cell 202_1 and the battery cell 202_4. Thus, no current can flow into the battery cells 202_2 and 202_6 and no energy can be transferred from the battery cell 202_1 to the battery cells 202_2 and 202_6.

In the above-mentioned embodiment, the winding 204_1 and the winding 204_4 functions as a primary winding and a secondary winding in the magnetic device 203 respectively. However, if the voltage of the battery cell 202_4 has a maximal value and the voltage of the battery cell 202_1 has a minimal value among the voltages of the battery cells 202_1-202_6, the battery management system 200 will transfer energy from the battery cell 202_4 to the battery cell 202_1. Under this circumstance, the winding 202_4 can function as a primary winding and the winding 202_1 can function as a secondary winding. To summarize, the windings 204_1, 204_2, . . . , or 204_6 can function as either a primary winding or a secondary winding under different circumstances.

Advantageously, the battery management system 200 can balance the target battery cells and other battery cells can be prevented from sending or receiving energy during the energy balancing operation, which will improve the system efficiency.

In an alternative embodiment, if the dot-connected terminal of the battery cell having the maximal voltage $V_H$, e.g., the battery cell 202_1, has the same polarity as the dot-connected terminal of the battery cell having the minimal voltage $V_L$, e.g., the battery cell 202_3, a current $I_3$, which is generated based on the current $I_1$ flows through the winding 204_1, flows through the winding 204_3 in the same direction as the current $I_1$. When the current $I_1$ flows from the positive terminal to the negative terminal of the battery cell 202_1, the current $I_3$ also flows from the positive terminal to the negative terminal of the battery cell 202_3. Thus the battery cell 202_3 cannot be charged by the current $I_3$, if the current $I_3$ is generated based on the current $I_1$. Under this circumstance, the battery management system 200 cannot move energy from 202_1 to 202_3 directly. Hence the battery management system 200 needs to select another two battery cells from a set of battery cells, whose dot-connected terminals have different polarity from the dot-connected terminals of the battery cells 202_1 and 202_3, for further operation.

More specifically, the detection and control unit 208 further selects a battery cell having a maximal voltage $V_{2H}$ and a battery cell having a minimal voltage $V_{2L}$ among the set of the battery cells, whose dot-connected terminals have different polarity from the dot-connected terminals of the battery cells 202_1 and 202_3. For example, as shown in FIG. 2, the detection and control unit 208 can select the battery cell 202_4 having the maximal value $V_{2H}$ and the battery cell 202_6 having the minimal value $V_{2L}$ among the battery cells 202_2, 202_4 and 202_6. Subsequently, the detection and control unit 208 will move energy from the battery cell 202_1 to the battery cell 202_6 and move energy from the battery cell 202_4 to the battery cell 202_3.

The detection and control unit 208 turns on the switches 206_1 and 206_6 alternately to transfer energy from the battery cell 202_1 to the battery cell 202_6 in a similar way as described above. Accordingly, the voltage of the battery cell 202_1 can be decreased. Thus an over-charging of the battery cell 202_1 can be avoided during the charging process.

Furthermore, the detection and control unit 208 turns on the switches 206_4 and 206_3 alternately to transfer energy from the battery cell 202_4 to the battery cell 202_3 in a similar way as described above. Accordingly, the voltage of the battery cell 202_3 can be increased. Thus an under-charging of the battery cell 206_3 can be avoided after the charging process.

During the operation, the detection and control unit 208 can detect the voltages of the battery cells 202_1-202_6 and balance the battery cells in a similarly way as described above according to the detecting result. As a result, when the charging process is finished, the voltage of each battery cell will be approximately equal, which will improve the charging efficiency and extend battery life of the battery pack 202 by preventing some inside battery cells from being over-charged.

Additionally, during a discharging process, the battery management system 200 can also detect the voltages of the battery cells 202_1-202_6 and balance the battery cells in a similar way as described above. If difference between a maximum value and a minimum value of the voltages of the battery cells 202_1-202_6 is lower than the first threshold or higher than the second threshold, the detection and control unit 208 will balance the corresponding battery cell in similar ways as described above. Thus the whole battery pack 202 can be well balanced in a relatively short time.

Advantageously, by balancing the battery cells during the discharging process, the battery cell which has a higher discharging rate and releases energy more quickly than other battery cells can be compensated with energy from the other battery cells. Thus energy among the battery cells can be well balanced and discharging time of the whole battery pack 202 can be increased, which improves the efficiency of the battery pack 202. Furthermore, the battery cells can be prevented from being over-discharged after the discharging process, which also extends the useful life of the battery pack 202.

In other embodiments, the detection and control unit 208 can detect other state parameters such as states of charges (SOCs) and/or capacitances of the battery cells 202_1-202_6 to balance the battery cells 202_1-202_6 according to the detecting results.

Figure 4:
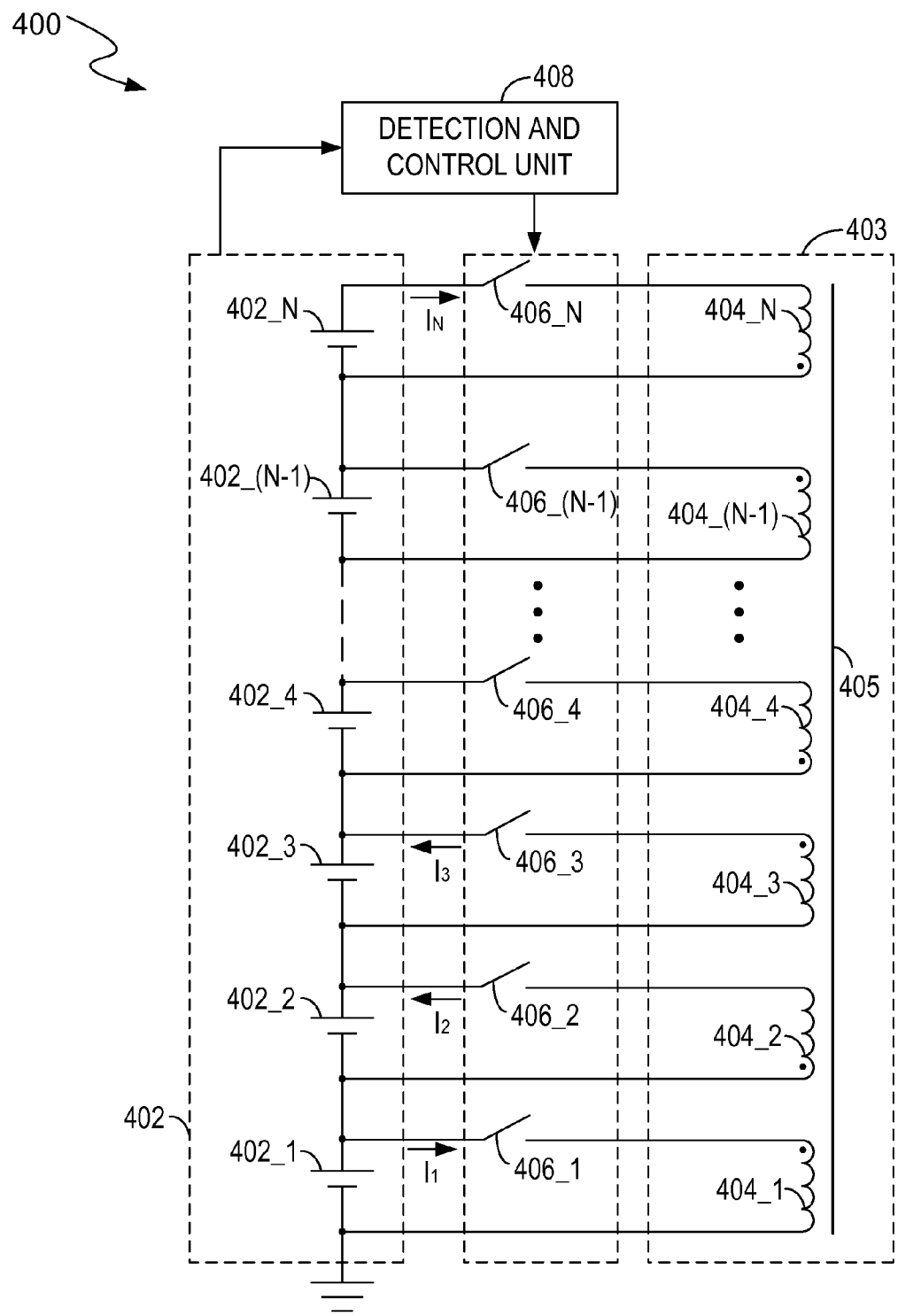
FIG. 4 illustrates a block diagram of a battery management system according to another embodiment of the present invention.

FIG. 4 illustrates a block diagram of a battery management system 400 according to another embodiment of the present invention. Structure of the battery management system 400 is similar to the structure of the battery management system 200 in FIG. 2.

As shown in FIG. 4, the battery management system 400 includes a battery pack 402, a magnetic device 403 and a detection and control unit 408. The battery pack 402 includes N battery cells 402_1-402_N coupled to N windings 404_1-404_N of the magnetic device 403 via N switches 406_1-406_N respectively. N is a positive integer. The N windings 404_1-404_N wire around a magnetic core 405 in the magnetic device 403.

In one embodiment, the battery cells 402_1-402_N are divided into two battery cell groups, e.g., the battery cells 402_1, 402_3, . . . , 402_(N−1) are classified into a first battery cell group, and the battery cells 402_2, 402_4, . . . , 402_N are classified into a second battery cell group. The dot-connected terminals of the battery cells 402_1, 402_3, . . . , 402_(N−1) in the first battery cell group have different polarity from the dot-connected terminals of the battery cells 402_2, 402_4, . . . , 402_N in the second battery cell group The detection and control unit 408 can detects voltages of the battery cells 402_1-402_N in the battery pack 402 and further selects a battery cell, e.g., the battery cell 402_1, having a maximal voltage $V_{1H}$ and a battery cell, e.g., the battery cell 402_3, having a minimal voltage $V_{1L}$ from the first battery group, and selects a battery cell, e.g., the battery cell 402_N, having a maximal voltage $V_{2H}$ and a battery cell, e.g., the battery cell 402_2, having a minimal voltage $V_{2L}$ from the second battery group.

If a difference $D_{1H1L}$ between the value $V_{1H}$ and the value $V_{1L}$, a difference $D_{2H2L}$ between the value $V_{2H}$ and the value $V_{2L}$, a difference $D_{1H2L}$ between the value $V_{1H}$ and the value $V_{2L}$, or a difference $D_{2H1L}$ between the value $V_{2H}$ and the value $V_{1L}$ is higher than a first threshold, e.g., 0.5V, abnormal condition may present in the battery pack 402. Thus the battery management system 400 will check the availability of the battery pack 402.

If the differences $D_{1H1L}$, $D_{2H2L}$, $D_{1H2L}$, and $D_{2H1L}$ are lower than a second threshold, e.g., 50 mV, the battery cells 402_1-402_N are well balanced.

If the differences $D_{1H1L}$, $D_{2H2L}$, $D_{1H2L}$, and $D_{2H1L}$ are between the first threshold and the second threshold, the battery cells 402_1-402_N are unbalanced. Thus the detection and control unit 408 needs to move energy from the battery cell 402_1, which belongs to the first battery group, to the battery cell 402_2, which belongs to the second battery group, and move energy from the battery cell 402_N, which belongs to the second battery group, to the battery cell 402_3, which belongs to the first battery group according to the following determinations.

Determination 1: if the difference $D_{1H1L}$ or the difference $D_{2H2L}$ is higher than a third threshold, e.g., 0.2V, or if the differences $D_{1H1L}$, $D_{2H2L}$, $D_{2H1L}$, and $D_{1H2L}$ are no higher than the third threshold, the detection and control unit 408 functions in a similar way as described above to move energy from the battery cell 402_1 to the battery cell 402_2 and to move energy from the battery cell 402_N to the battery cell 402_3.

More specifically, the detection and control unit 408 generates a first control signal having a frequency $F_1$ with a duty cycle $D_1$ to the switch 406_1 and generates a second control signal having the same frequency $F_1$ with a duty cycle equal to or less than $(1-D_1)$ to the switch 406_2 for turning on the switch 406_1 and the switch 406_2 alternately. When the switch 406_1 is turned on in response to the first control signal, the switch 406_2 is off in response to the second control signal. A current $I_1$ flows from the battery cell 402_1 to the winding 404_1. Thus energy of the battery cell 402_1 can be transferred to and accumulated in the magnetic core 405. After the switch 406_1 is turned off in response to the first control signal, the switch 402_2 can be turned on in response to the second control signal. Once the switch 406_1 is turned off, the current $I_1$ becomes to approximately zero. When the switch 402_2 is turned on, a current $I_2$ induced in the winding 404_2 flows to the battery cell 402_2 for charging the battery cell 402_2. Thus the stored energy, which is transferred from the battery cell 402_1, in the magnetic core 405 can be released to the battery cell 402_2. The detection and control unit 408 continues to turn on the switch 406_1 and 406_2 alternately until the voltage of the battery cell 402_1 is approximately equal to the voltage of the battery cell 402_2.

Furthermore, the detection and control unit 408 generates a third control signal having a frequency $F_2$ with a duty cycle $D_N$ to the switch 406_N and generates a fourth control signal having the frequency $F_2$ with a duty cycle equal to or less than $(1-D_N)$ to the switch 406_3 for turning on the switches 406_N and 406_3 alternately. In one embodiment, the frequency $F_2$ can be the same as the frequency $F_1$ and the duty cycle $D_N$ can be the same as the duty cycle $D_1$. When the switch 406_N is turned on in response to the third control signal, the switch 406_3 is turned off in response to the fourth control signal. A current $I_N$ flows from the battery cell 402_1 to the winding 404_1. Thus energy of the battery cell 402_N can be transferred to and accumulated in the magnetic core 405. After the switch 406_N is turned off in response to the third control signal, the switch 402_3 can be turned on in response to the fourth control signal. Once the switch 406_N is turned off, the current $I_N$ becomes to approximately zero. When the switch 402_3 is turned on, a current $I_3$ induced in the winding 404_3 flows to the battery cell 402_3 for charging the battery cell 402_3. Thus the stored energy, which is transferred from the battery cell 402_N, in the magnetic core 405 can be released to the battery cell 402_3. The detection and control unit 408 continues to turn on the switch 406_N and 406_3 alternately until the voltage of the battery cell 402_3 increases approximately equal to the voltage of the battery cell 402_N.

Determination 2: if the difference $D_{1H1L}$ and the difference $D_{2H2L}$ are no higher than the third threshold, but the difference $D_{2H1L}$ or the difference $D_{1H2L}$ is higher than the third threshold, the detection and control unit 408 can further compare the difference $D_{2H1L}$ with the difference $D_{1H2L}$. If the difference $D_{2H1L}$ is higher than the difference $D_{1H2L}$, the detection and control unit 408 functions in a similar way as described above to move energy from the battery cell 402_N to the battery cell 402_3. Otherwise, the detection and control unit 408 functions in a similar way as described above to move energy from the battery cell 402_1 to the battery cell 402_2.

To summarize, in the battery management system 400, the battery cells 402_1-402_N in the battery pack 402 can be divided into a first battery group and a second battery group based on different connections between the battery cells 402_1-402_N and the corresponding windings 404_1-404_N. For example, the positive terminals of the battery cells 402_1, 402_3, . . . , and 402_(N−1) in the first battery group are connected to the polarity mark (one end with dot) of the windings 404_1, 404_3, . . . , and 404_(N−1) and the negative terminals of the battery cells 402_2, 402_4, . . . , and 402_N in the second battery group are connected to the polarity mark (one end with dot) of the windings 404_2, 404_4, . . . , and 404_N. The detection and control unit 408 selects a first battery cell having a maximal voltage and a second battery cell having a minimal voltage from the first battery group and selects a third battery cell having a maximal voltage and a fourth battery cell having a minimal voltage from the second battery group. The detection and control unit 408 further turns on the corresponding switches alternately to move energy from the first battery cell to the fourth battery cell and to move energy from the third battery cell to the second battery cell according to the differences between the voltages of the selected battery cells. Since the detection and control unit 408 can transfer energy between two pairs of the battery cells in every cycle, the voltage of the battery cells can be better balanced.

Figure 5:
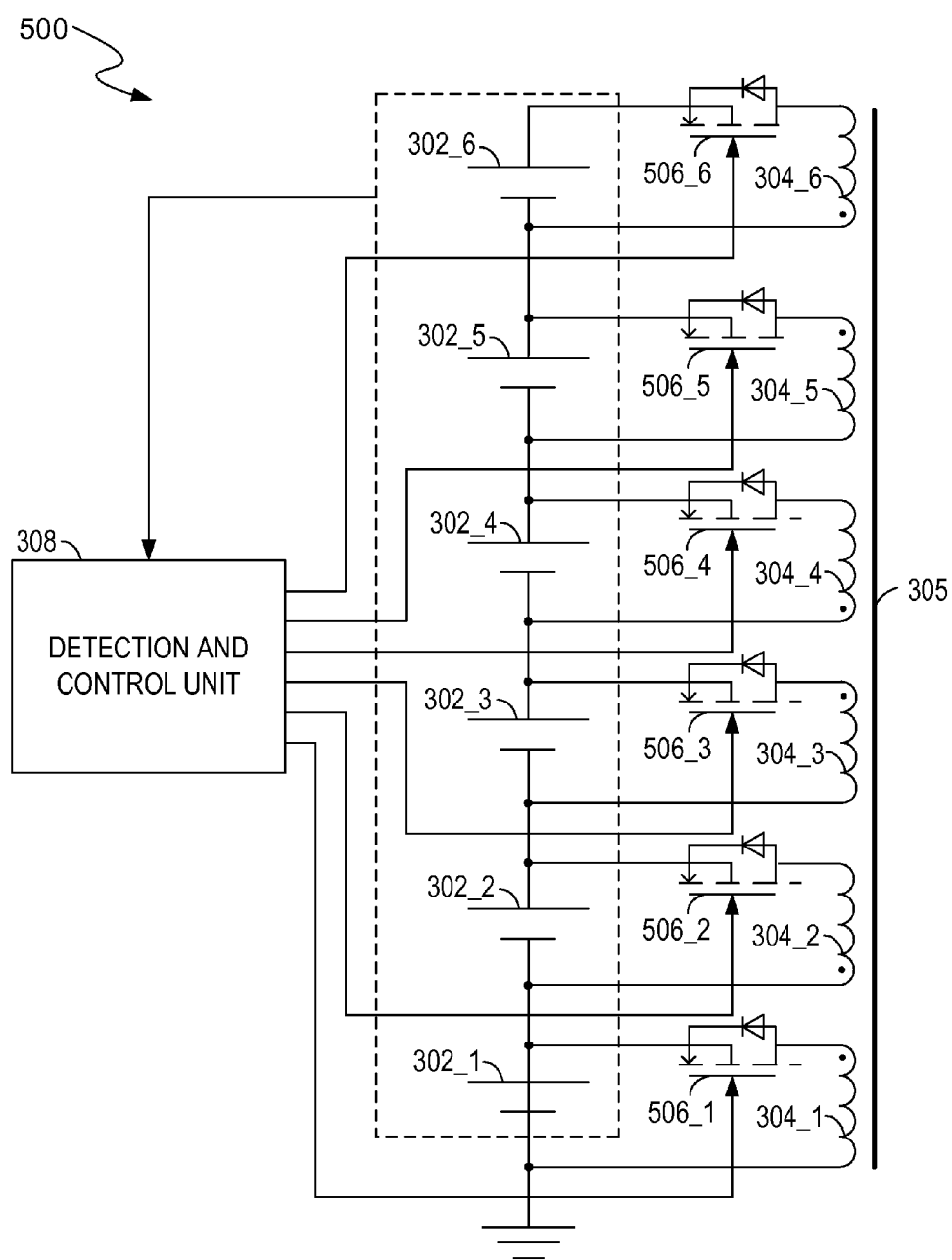
FIG. 5 illustrates a block diagram of a battery management system according to yet another embodiment of the present invention.

FIG. 5 illustrates a block diagram of a battery management system 500 according to another embodiment of the present invention. Elements that are labeled the same as in FIG. 3 have similar functions and will not be described herein. FIG. 5 is described in combination with FIG. 3.

In FIG. 5, transistors 506_1-506_6, e.g., metal oxide semiconductor field effect transistors (MOSFETs), function as switches in the battery management system 500. Each MOSFET includes a body diode. When the detection and control unit 208 detects that the battery cell 302_1 having a maximal voltage and the battery cell 302_4 having a minimal voltage in the battery pack 302, the detection and control unit 308 turns on the MOSFETs 506_1 and 506_4 alternately to transfer energy from the battery cell 302_1 to the battery cell 302_4. When the MOSFET 506_1 is turned on, the MOSFET 506_4 is turned off. Thus energy of the battery cell 302_1 can be transferred to and accumulated in the magnetic core 305. After the MOSFET 506_1 is turned off, the MOSFET 506_4 can be turned on. Thus a current can be induced in the winding 304_4. Because of the body diode exiting in each MOSFET, when the switch 506_1 is turned off, minor currents can be also induced in the windings 304_2 and 304_6. However, those induced currents are reversely proportional to equivalent load reactance coupled to the corresponding windings. As a result, when the MOSFETs 506_2 and 506_6 are turned off, the currents induced in the windings 304_2 and 304_6 are relatively small and can be ignored because the equivalent load reactance coupled to the windings 304_2 and 304_6 are relatively high. Thus the energy stored in the magnetic core 305 can be mainly transferred to the battery cell 302_4.

Figure 6:
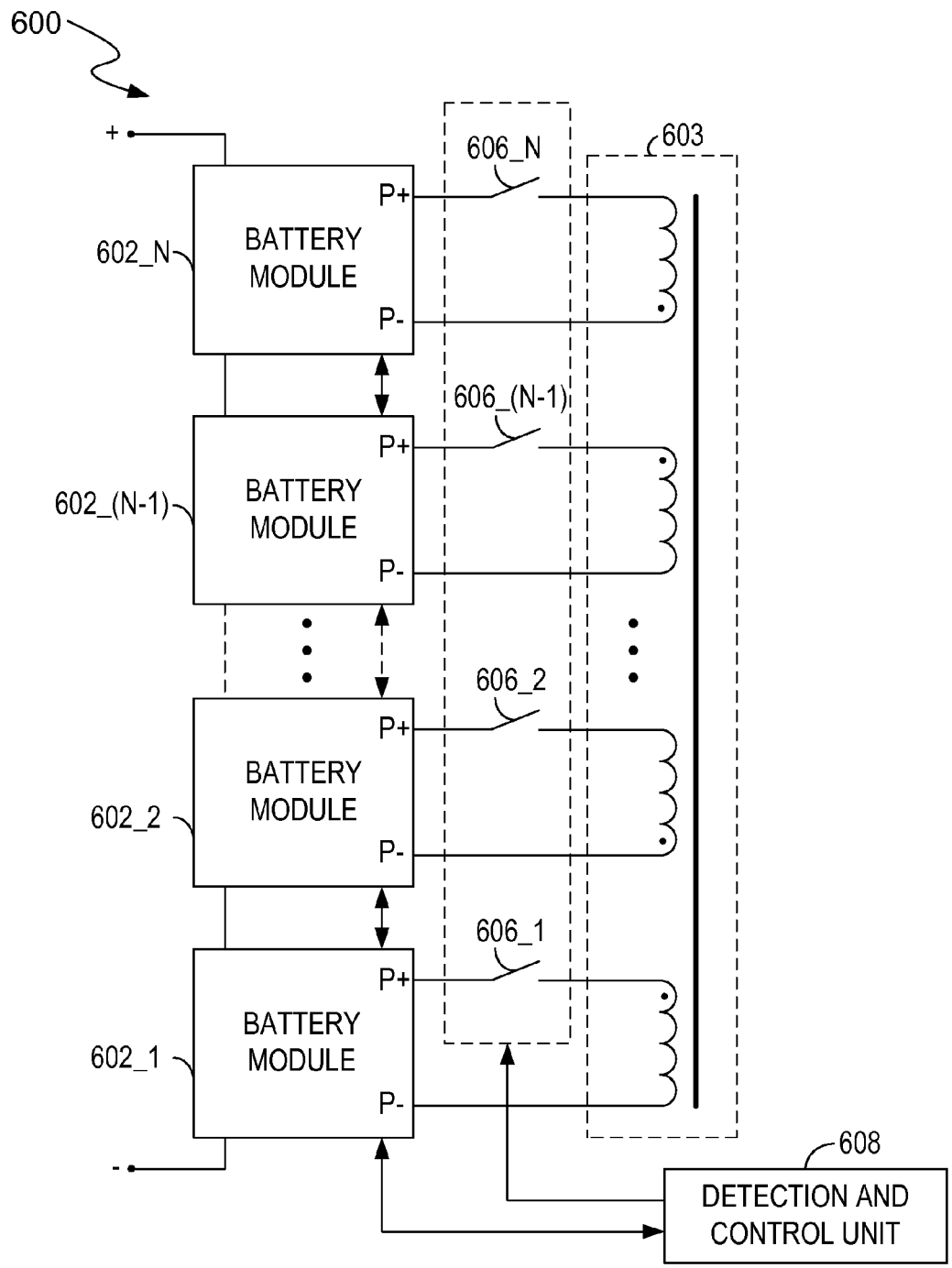
FIG. 6 illustrates a block diagram of a battery management system according to yet another embodiment of the present invention.

FIG. 6 illustrates a block diagram of a battery management system 600 according to another embodiment of the present invention. The battery management system 600 includes N serial-coupled battery modules 602_1, 602_2, . . . , 602_(N−1) and 602_N. Each battery module 602_1, 602_2, . . . , 602_(N−1) or 602_N includes multiple battery cells (not shown in FIG. 6). A magnetic device, e.g., a transformer 603, includes multiple windings wiring around a magnetic core. The battery modules 602_1, 602_2, . . . , 602_(N−1) and 602_N are coupled to the corresponding windings of the transformer 603 via corresponding switches 606_1-606_N.

A detection and control unit 608 detects voltages of the battery modules 602_1, 602_2, . . . , 602_(N−1) and 602_N, and calculates a difference between a first voltage and a second voltage among the voltages of the battery modules 602_1, 602_2, . . . , 602_(N−1) and 602_N. The first voltage is higher than the second voltage. In one embodiment, among the voltages of the battery modules 602_1, 602_2, . . . , 602_(N−1) and 602_N, the first voltage is a maximal voltage and the second voltage is a minimal voltage.

If the difference between the first voltage and the second voltage is higher than a first threshold, e.g., 0.5V, the battery modules 602_1, 602_2, . . . , 602_(N−1) and 602_N may work in an abnormal condition. Thus the battery management system 600 will check availabilities of the battery modules 602_1, 602_2, . . . , 602_(N−1) and 602_N.

If the difference is lower than a second threshold, e.g., 50 mV, the battery modules 602_1, 602_2, . . . , 602_(N−1) and 602_N can be regarded as well balanced.

If the difference is between the first threshold and the second threshold, the battery modules 602_1, 602_2, . . . , 602_(N−1) and 602_N are unbalanced. Thus the transformer 603 turns on a first switch corresponding to a first battery module having the first voltage and a second switch corresponding to a second battery module having the second voltage alternately to move energy from the first battery module to the second battery module until the first voltage of the first battery module decreases approximately equal to the second voltage of the second battery module. A whole battery module, e.g., the battery module 602_1, 602_2, . . . , 602_(N−1) or 602_N, can be regarded as a battery cell during the operation described above. Thus the battery management system 600 functions similarly to the battery management systems 200, 400 and/or 500 as described above.

As described above, each battery module 602_1, 602_2, . . . , 602_(N−1) or 602_N includes multiple battery cells. Furthermore, each battery module 602_1, 602_2, . . . , 602_(N−1) or 602_N includes a subordinate transformer and a subordinate detection and control unit (not shown in FIG. 6). Each subordinate transformer also includes multiple windings wiring around a magnetic core (not shown in FIG. 6). In each battery module 602_1, 602_2, . . . , 602_(N−1) or 602_N, the battery cells are coupled to the corresponding windings of the subordinate transformer via corresponding switches. The subordinate detection and control unit detects voltages of the battery cells and move energy from a cell or group of cells to another cell or group of cells to balance the battery cells, based on the detecting result in a similar way as described in FIG. 2, FIG. 4 and/or FIG. 5.

Figure 7:
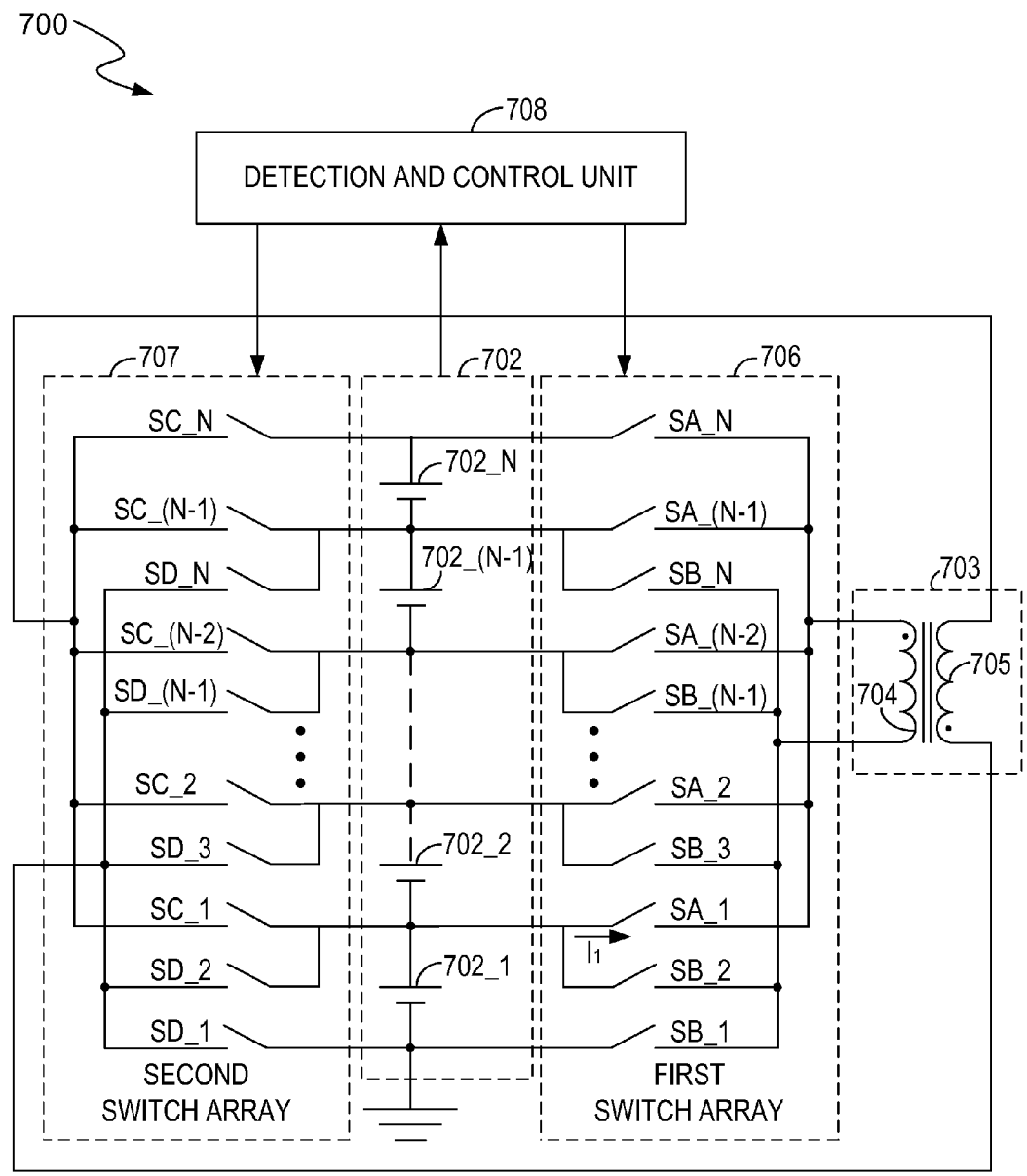
FIG. 7 illustrates a block diagram of a battery management system according to yet another embodiment of the present invention.

FIG. 7 illustrates a block diagram of a battery management system 700 according to yet another embodiment of the present invention. A battery pack 702 includes N serial-coupled battery cells 702_1-702_N. A magnetic device, e.g., a transformer 703, includes a first winding 704 and a second winding 705 wiring around a common magnetic core in a reverse direction. For each battery cell 702_K (1≤K≤N), a switch SA_K is coupled between a positive terminal of the battery cell 702_K and an end of the winding 704, a switch SB_K is coupled between a negative terminal of the battery cell 702_K and the other end of the winding 704, a switch SC_K is coupled between the positive terminal of the battery cell 702_K and an end of the winding 705, and a switch SD_K is coupled between the negative terminal of the battery cell 702_K and the other end of the winding 705.

A detection and control unit 708 detects voltages of the battery cells 702_1-702_N and calculates a difference between a maximal voltage and a minimal voltage among the voltages of the battery cells 702_1-702_N.

If the difference between the maximal voltage and the minimal voltage is higher then a first threshold, e.g., 0.5V, abnormal condition may present in the battery pack 702. Thus the battery management system 700 will check the availability of the battery pack 702.

If the difference is lower than a second threshold, e.g., 50 mV, the battery cells 702_1-702_N can be regarded as well balanced.

If the difference is between the first threshold and the second threshold, the battery cells 702_1-702_N are unbalanced. Thus the detection and control unit 708 controls the corresponding switches coupled to a battery cell, e.g., the battery cell 702_1, having the maximal voltage and a second battery cell, e.g., the battery cell 702_N, having the minimal voltage respectively to move energy from the battery cell 702_1 to the battery cell 702_N via the first and second windings 704 and 705.

The first winding 704 functions as a primary winding and the second winding 705 functions as a secondary winding in the transformer 703. Under such circumstance, the detection and control unit 708 generates a first control signal having a frequency $F_1$ with a duty cycle $D_1$ to the switch SA_1 and the switch SB_1 coupled to the battery cell 702_1 (in following description, a switch set SAB_1 will represent the switch SA_1 and the switch SB_1 for short description), and generates a second control signal having the same frequency $F_1$ with a duty cycle equal to or less than $(1-D_1)$ to the switch SC_N and the switch SD_N coupled to the battery cell 702_N (in following description, a switch set SCD_N will represent the switch SC_N and the switch SD_N for short description) to turn on the switch set SAB_1 and the switch set SCD_N alternately.

More specifically, when the switch set SAB_1 are turned on in response to the first control signal, the switch set SCD_N are turned off in response to the second control signal. A current $I_1$ can flow from the battery cell 702_1 to the first winding 704, and energy of the battery cell 702_1 can be transferred to and accumulated in a magnetic core of the transformer 703. After the switch set SAB_1 are turned off in response to the first control signal, the switch set SCD_N are turned on in response to the second control signal. Once the switch set SAB_1 are turned off, the current $I_1$ becomes to approximately zero. When the switch set SCD_N are turned on, a current $I_N$ induced in the second winding 705 flows to the battery cell 702_N for charging the battery cell 702_N. Thus the energy stored in the magnetic core of the transformer 703 can be released to the battery cell 702_N. Finally, energy can be transferred from the battery cell 702_1 to the battery cell 702_N. Accordingly, the voltage of the battery cell 702_1 is decreased and the voltage of the battery cell 702_N is increased. The detection and control unit 208 continues to turn on the switch set SAB_1 and the switch set SCD_N alternately until the voltage of the battery cell 702_1 decreases approximately equal to the voltage of the battery cell 702_N.

In yet another embodiment, the second winding 705 functions as a primary winding and the first winding 704 functions as a secondary winding in the transformer 703. Under such circumstance, the detection and control unit 708 generates the first control signal to a switch set SCD_1 including the switches SC_1 and SD_1 coupled to the battery cell 702_1 and generates the second control signal to a switch set SAB_N including the switches SAN and SB_N coupled to the battery cell 702_N for turning on the switch set SCD_1 and the switch set SAB_N alternately.

When the switch set SCD_1 are turned on in response to the first control signal, the switch set SAB_N are turned off in response to the second control signal. A current $I_1$ can flow from the battery 702_1 to the second winding 705, and energy of the battery cell 702_1 can be transferred to and accumulated in the magnetic core of the transformer 703. After the switch set SCD_1 are turned off in response to the first control signal, the switch set SAB_N are turned on in response to the second control signal. Once the switch set SCD_1 are turned off, the current $I_1$ becomes to approximately zero. When the switch set SAB_N are turned on, a current $I_N$ induced in the first winding 704 flows to the battery cell 702_N for charging the battery cell 702_N. Thus the energy stored in the magnetic core of the transformer 703 can be released to the battery cell 702_N. The detection and control unit 208 continues to turn on the switch set SCD_1 and the switch set SAB_N alternately until the voltage of the battery cell 702_1 decreases approximately equal to the voltage of the battery cell 702_N.

Additionally, the other switches, except the switches SA_1, SB_1, SC_N and SD_N are kept off during the operation of balancing energy between the battery cell 702_1 and the battery cell 702_N. Thus energy will not be transferred from the other battery cells to the magnetic core of the transformer 703 or released from the magnetic core of the transformer 703 to the other battery cells.

Advantageously, by coupling the winding 704 to the battery cells 702_1-702_N via the switches SA_1-SA_N and SB_1-SB_N and by coupling the winding 705 to the battery cells 702_1-702_N via the switches SC_1-SC-N and SD_1-SD_N, the battery cells 702_1-702_N can be connected to the windings 704 and 705 separately to transfer energy to the magnetic device 703 and to receive energy from the magnetic device 703. Thus the battery management system 700 can transfer energy between two battery cells by coupling the first battery cell to one winding for transferring energy of the first battery cell to the magnetic core and coupling the second battery cell to the other winding for transferring the energy stored in the magnetic core to the second battery cell. Hence, only two windings are needed in the battery management system 700 to balance any two battery cells in the battery cells 702_1-702_N, which may decrease the cost and size of the system.

Figure 8:
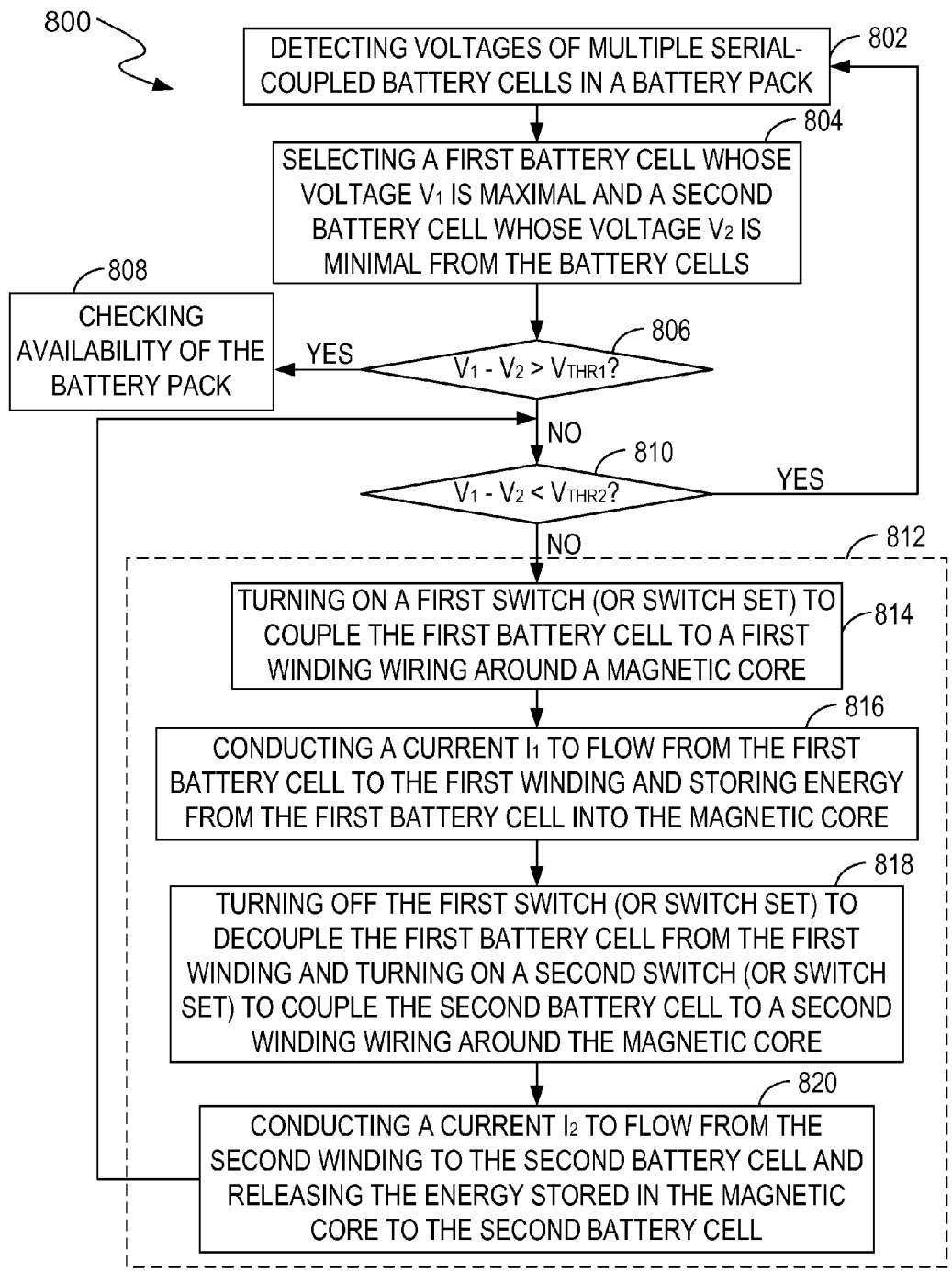
FIG. 8 illustrates a flowchart of operations performed by a battery management system according to one embodiment of the present invention.

FIG. 8 illustrates a flowchart 800 of operations performed by a battery management system, e.g., a battery management system 700 in FIG. 7, according to one embodiment of the present invention. FIG. 8 is described in combination with FIG. 7.

In block 802, the detection and control unit 708 detects voltages of multiple battery cells 702_1-702_N. In block 804, the detection and control unit 708 selects a first battery cell, e.g., the battery cell 702_1, with a maximal voltage $V_1$ and a second battery cell, e.g., the battery cell 702_N, with a minimal voltage $V_2$ from the battery cells 702_1-702_N. In block 806, if a difference between the voltage $V_1$ of the first battery cell and the voltage $V_2$ of the second battery cell is higher than a first threshold $V_{THR1}$, e.g., 0.5V, abnormal condition may present in the battery pack 702. Thus the battery management system 700 will check availability of the battery pack 702 in block 808. If the difference is no higher than the first threshold $V_{THR1}$ in block 806, the flowchart 800 goes to block 810.

In block 810, if the difference is lower than a second threshold, e.g., 50 mV, energy among the battery cells 702_1-702_N can be regarded as well balanced. The flowchart 800 returns to block 802 to monitor the voltages of the battery cells 702_1-702_N continuously.

If the difference is not lower than the second threshold in block 810, the battery cells 702_1-702_N are unbalanced. Thus the detection and control unit 700 will move energy from the battery cell 702_1 to the battery cell 702_N in block 812.

In one embodiment, the step in block 812 includes multiple sub-steps shown in blocks 814-820. In block 814, a first switch or a first switch set including at least two switches are turned on to couple the battery cell 702_1 to a first winding wiring around a magnetic core, e.g., the winding 704 of the transformer 703. Thus a current $I_1$ can be conducted to flow from the battery cell 702_1 to the first winding and energy from the first battery cell 702_1 can be stored in the magnetic core in block 816. In block 818, the first switch or the first switch set are turned off to decouple the battery cell 702_1 from the first winding and a second switch or a second switch set including at least two switches are turned on to couple the battery cell 702_N to a second winding wiring around the magnetic core, e.g., the winding 705 of the transformer 703. Thus a current $I_2$ induced in the second winding can be conducted to flow through the battery cell 702_N and energy stored in the magnetic core is released into the battery cell 702_N in block 820. Then the battery monitoring process returns to block 810.

If the difference between the voltage $V_1$ of the battery cell 702_1 and the voltage $V_2$ of the battery cell 702_N is lower than the second threshold in block 810, the flowchart 800 returns to block 802. Otherwise, the flowchart 800 goes to block 814. The detection and control unit 708 continues to transfer energy from the battery cell 702_1 to the battery cell 702_N until the difference between the voltage $V_1$ and the voltage $V_2$ decreases lower than the second threshold.

Figure 9:
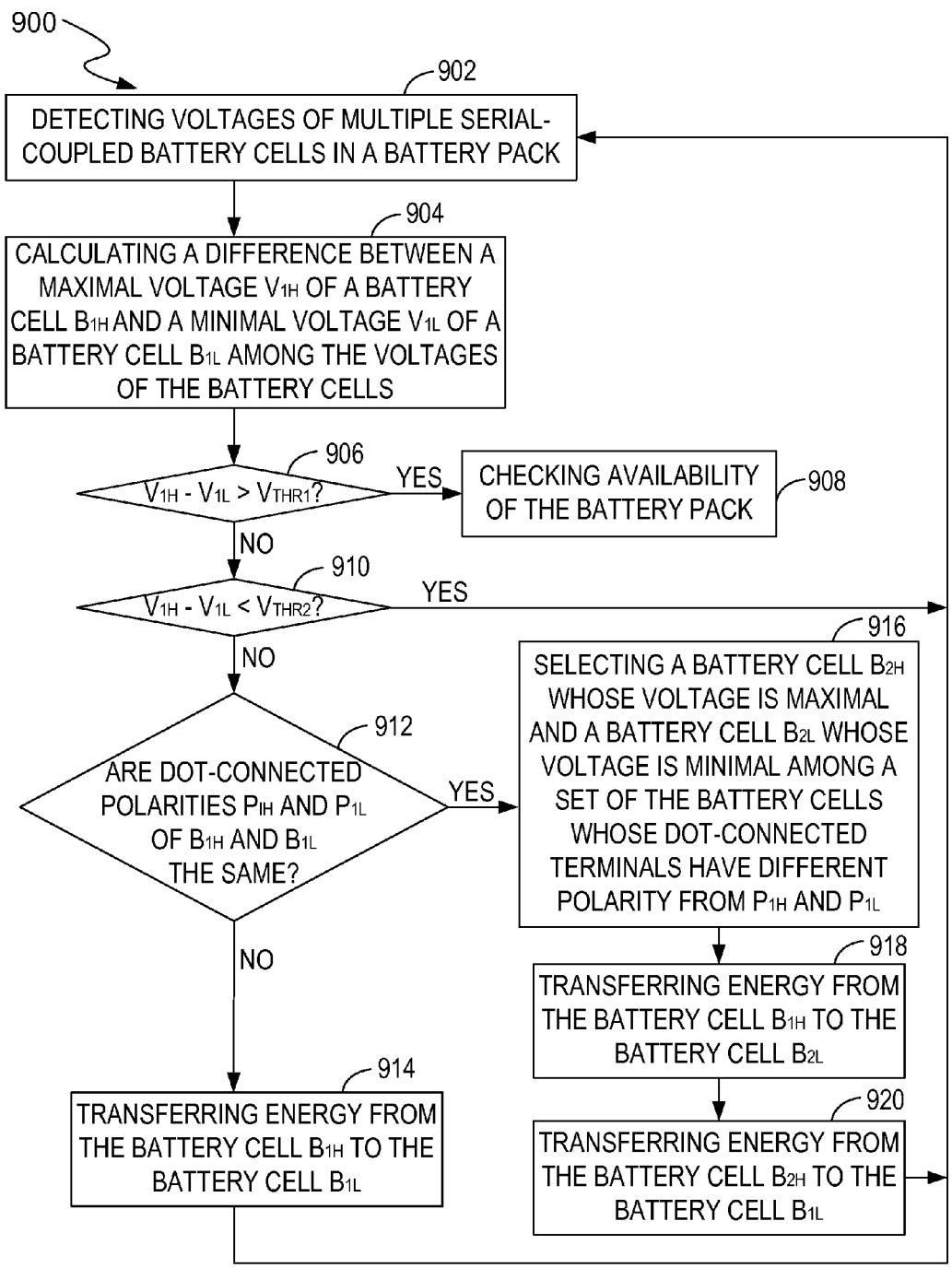
FIG. 9 illustrates a flowchart of operations performed by a battery management system according to another embodiment of the present invention.

FIG. 9 illustrates a flowchart 900 of operations performed by a battery management system, e.g., the battery management system 200 in FIG. 2, according to one embodiment of the present invention. FIG. 9 is described in combination with FIG. 2.

In block 902, the detection and control unit 208 detects voltages of multiple serial-coupled battery cells 202_1-202_6. In block 904, the detection and control unit 208 calculates a difference between a maximal voltage $V_{1H}$ and a minimal voltage $V_{1L}$ from the voltages of the battery cells 202_1-202_6. In block 906, if the difference between the voltages $V_{1H}$ and $V_{1L}$ is lower than a first threshold, e.g., 0.5V, abnormal condition may present in the battery pack 202. Thus the battery management system 200 will check availability of the battery pack 202 in block 908. If the difference is no lower than the first threshold, the flowchart 900 goes to block 910.

In block 910, if the difference is lower than a second threshold, e.g., 50 mV, the battery cells 202_1-202_6 can be regarded as well balanced. The flowchart 900 returns to block 902 to detect the voltages of the battery cells 202_1-202_6 continuously. If the difference is no lower than the second threshold in block 910, the flowchart 900 goes to block 912.

In block 912, if a dot-connected terminal $P_{1H}$ of a battery cell $B_{1H}$ having the maximal voltage $V_{1H}$ has different polarity from a dot-connected terminal $P_{1L}$ of a battery cell $B_{1L}$ having the minimal voltage $V_{1L}$, the flowchart 900 goes to block 914. Otherwise, the flowchart 900 goes to block 916.

In block 914, the detection and control unit 208 move energy from the battery cell $B_{1H}$ to the battery cell $B_{1L}$ in a similar way as described in block 812. Then the flowchart 900 returns to block 902. In block 916, the detection and control unit 208 selects a battery cell $B_{2H}$ with a maximal voltage and a battery cell $B_{2L}$ with a minimal voltage from a set of the battery cells whose dot-connected terminals have different polarity from the dot-connected terminals $P_{1H}$ and $P_{1L}$. In block 918, the detection and control unit 208 transfers energy from the battery cell $B_{1H}$ to the battery cell $B_{2L}$ in a similar way as described in block 812. In block 920, the detection and control unit 208 transfers energy from the battery cell $B_{2H}$ to the battery cell $B_{1L}$ in a similar way as described in block 812. Then the flowchart 900 returns to block 902.

Figure 10:
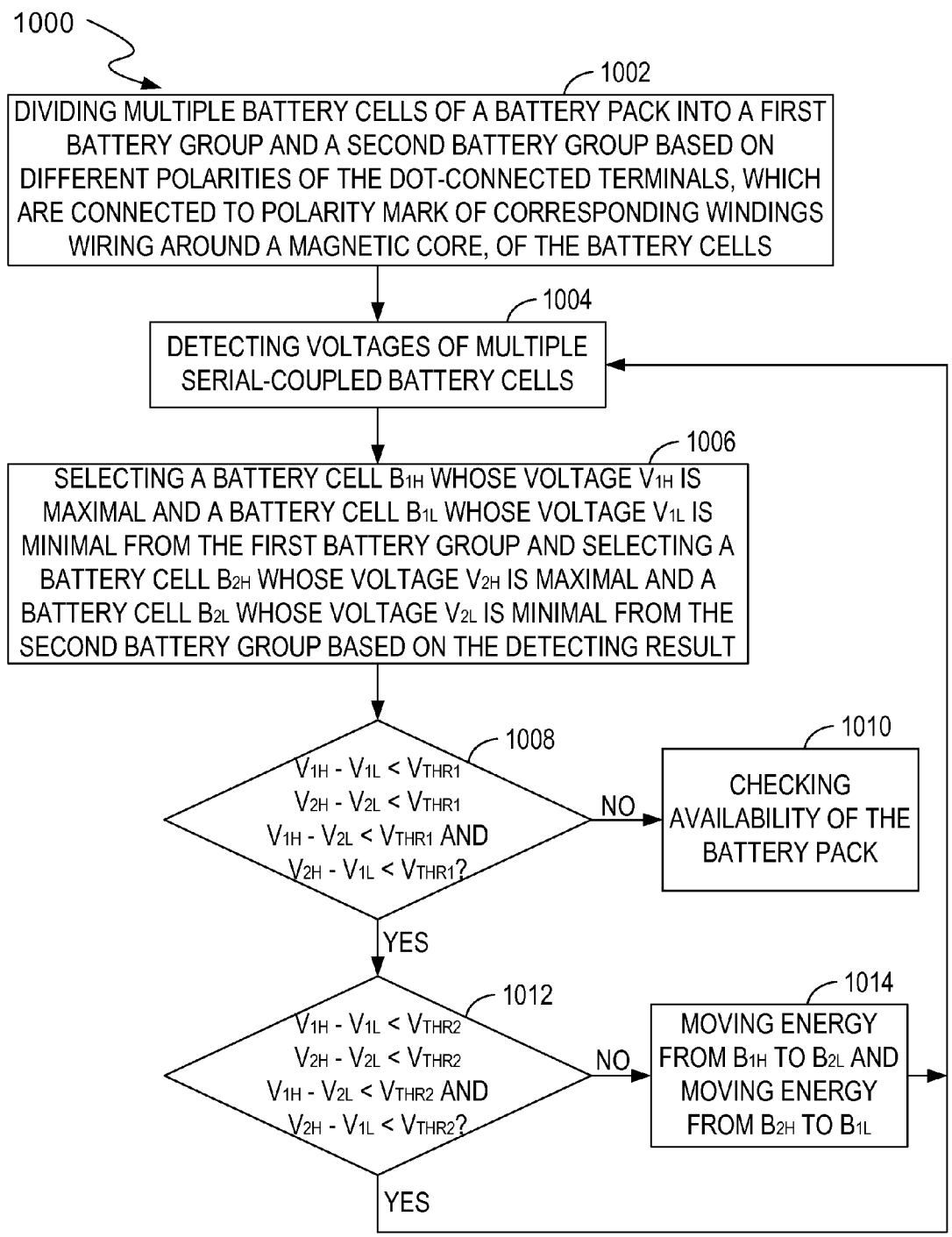
FIG. 10 illustrates a flowchart of operations performed by a battery management system according to yet another embodiment of the present invention.

FIG. 10 illustrates a flowchart 1000 of operations performed by a battery management system, e.g., the battery management system 400 in FIG. 4, according to one embodiment of the present invention. FIG. 10 is described in combination with FIG. 4.

In block 1002, multiple serial-coupled battery cells 402_1-402_N are divided into a first and a second groups. The dot-connected terminals of the battery cells, e.g., the battery cells 402_1, 402_3, ..., 402_(N−1), in the first group have different polarity from the dot-connected terminals of the battery cells, e.g., the battery cells 402_2, 402_4, ..., 402_N, in the second group.

In block 1004, the detection and control unit 408 detects voltages of the battery cells 402_1-402_N. In block 1006, the detection and control unit 408 selects a battery cell $B_{1H}$ with a maximal voltage $V_{1H}$ and a battery cell $B_{1L}$ with a minimal voltage $V_{1L}$ from the first battery group and selects a battery cell $B_{2H}$ with a maximal voltage $V_{2H}$ and a battery cell $B_{2L}$ with a minimal voltage $V_{2L}$ from the second battery group.

In block 1008, if a difference $D_{1H1L}$ between the voltage $V_{1H}$ and the voltage $V_{1L}$, a difference $D_{2H2L}$ between the voltage $V_{2H}$ and the voltage $V_{2L}$, a difference $D_{1H2L}$ between the voltage $V_{1H}$ and the voltage $V_{2L}$, or a difference $D_{2H1L}$ between the voltage $V_{2H}$ and the voltage $V_{1L}$ is higher than a first threshold, e.g., 0.5V, abnormal condition may present in the battery pack 402. Thus the battery management system 400 will check availability of the battery pack 402 in block 1010. If the differences $D_{1H1L}$, $D_{2H2L}$, $D_{1H2L}$, and $D_{2H1L}$ are no higher than the first threshold, the flowchart 1000 goes to block 1012.

In block 1012, if the differences $D_{1H1L}$, $D_{2H2L}$, $D_{1H2L}$, and $D_{2H1L}$ are lower than a second threshold, e.g., 50 mV, the battery cells 402_1-402_N can be regarded as well balanced and the flowchart 1000 returns to block 1004. Otherwise, the flowchart goes to block 1014 to move energy from the battery cell $B_{1H}$ to the battery cell $B_{2L}$ and move energy from the battery cell $B_{2H}$ to the battery cell $B_{1L}$.

Figure 11:
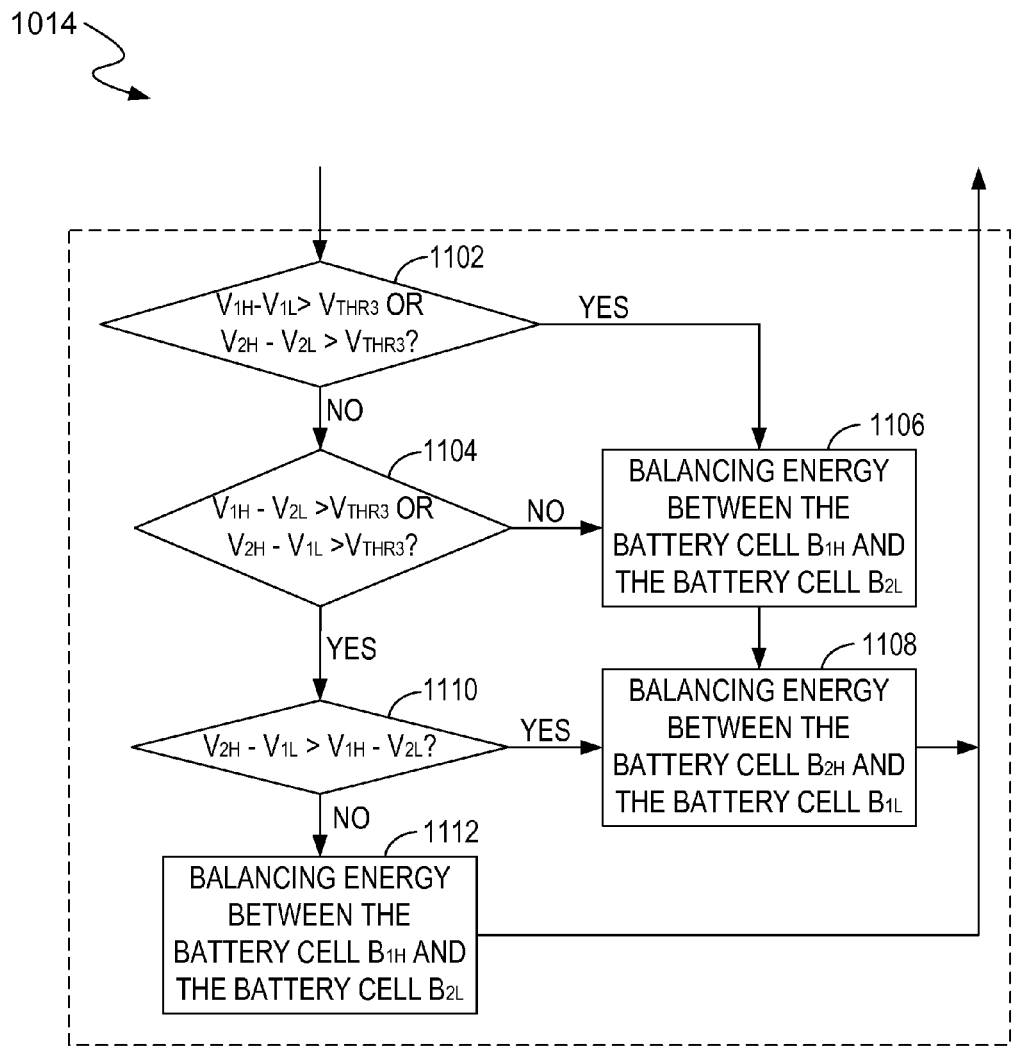
FIG. 11 illustrates a flowchart of extension operations performed by the battery management system in FIG. 10 according to one embodiment of the present invention.

Block 1014 further includes multiple steps illustrated by FIG. 11 according to one embodiment of the present invention. As shown in FIG. 11, the flowchart 1000 goes to block 1102. In block 1102, if the difference $D_{1H1L}$ or the difference $D_{2H2L}$ is higher than a third threshold, e.g., 0.2V, the flowchart 1000 goes to block 1106. Otherwise, the flowchart 1000 goes to block 1104.

In block 1104, if the difference $D_{1H2L}$ or the difference $D_{2H1L}$ is higher than the third threshold, the flowchart 1000 goes to block 1110. Otherwise, the flowchart 1000 goes to block 1106.

In block 1106, the detection and control unit 408 moves energy from the battery cell $B_{1H}$ to the battery cell $B_{2L}$ in a similar way as described in block 812. In block 1108, the detection and control unit 408 moves energy from the battery cell $B_{2H}$ to the battery cell $B_{1L}$ in a similar way as described in block 812. Then the flowchart 1000 returns to block 1004.

In block 1110, if the difference $D_{2H1L}$ is higher than the difference $D_{1H2L}$, the flowchart 1000 goes to block 1108 to move energy from the battery cell $B_{2H}$ to the battery cell $B_{1L}$ in a similar way as described in block 812. Then the flowchart 1000 returns to block 1004.

In block 1110, if the difference $D_{2H1L}$ is no higher than the difference $D_{1H2L}$, the flowchart 1000 goes to block 1112. In block 1112, the detection and control unit 408 moves energy from the battery cell $B_{1H}$ to the battery cell $B_{2L}$ in a similar way as described in block 812. Then the flowchart 1000 returns to block 1004.

Additionally, as described above, the battery management system 200 can be used to move energy among multiple battery cells to balance the battery cells during a discharging process. Similarly, the battery management systems 400, 500, 600 and 700 can also move energy among multiple battery cells to balance the battery cells during a discharging process such that discharging time of the whole battery pack can be increased and the battery cells can be prevented from being over-discharged during the discharging process, which may extend the useful life and improve the efficiency of the battery pack.

Accordingly, embodiments in accordance with the present invention provide a battery management system for move energy from a cell or group of cells to another cell or group of cells to balance multiple battery cells. The battery management system includes a magnetic device. The magnetic device includes a magnetic core and multiple windings wiring around the magnetic core. The multiple battery cells are coupled to the multiple windings wiring around a magnetic core via multiple switches respectively. The battery management system further includes a detection and control unit for detecting voltage of the battery cells and controlling the switches for transferring energy among the battery cells via the windings. When the battery management system detects a difference between two battery cells are higher than a predetermined threshold, the battery management system turns on two switches respectively coupled to the two battery cells alternately for transferring energy from the first battery cell with a higher voltage to the second battery cell with a lower voltage via the corresponding windings until the voltage of the first battery cell is approximately equal to the voltage of the second battery cell.

When the first switch coupled to the first battery cell is turned on, the second switch coupled to the second battery cell is turned off. A current can be conducted to flow from the first battery cell to the corresponding winding. Thus energy of the first battery cell can be transferred to and stored in the magnetic core. After the first switch is turned off, the second switch is turned on. A current is induced in the corresponding winding and flows to the second battery cell. Thus energy stored in the magnetic core can be released to the second battery cell.

Additionally, the switches coupled to the other battery cells are kept off during the operation of transferring energy from the first battery cell to the second battery cell. Advantageously, the battery management system can move energy between the target battery cells and other battery cells can be prevented from sending or receiving energy during the energy balancing operation, which may improve the system efficiency.

Figure 12:
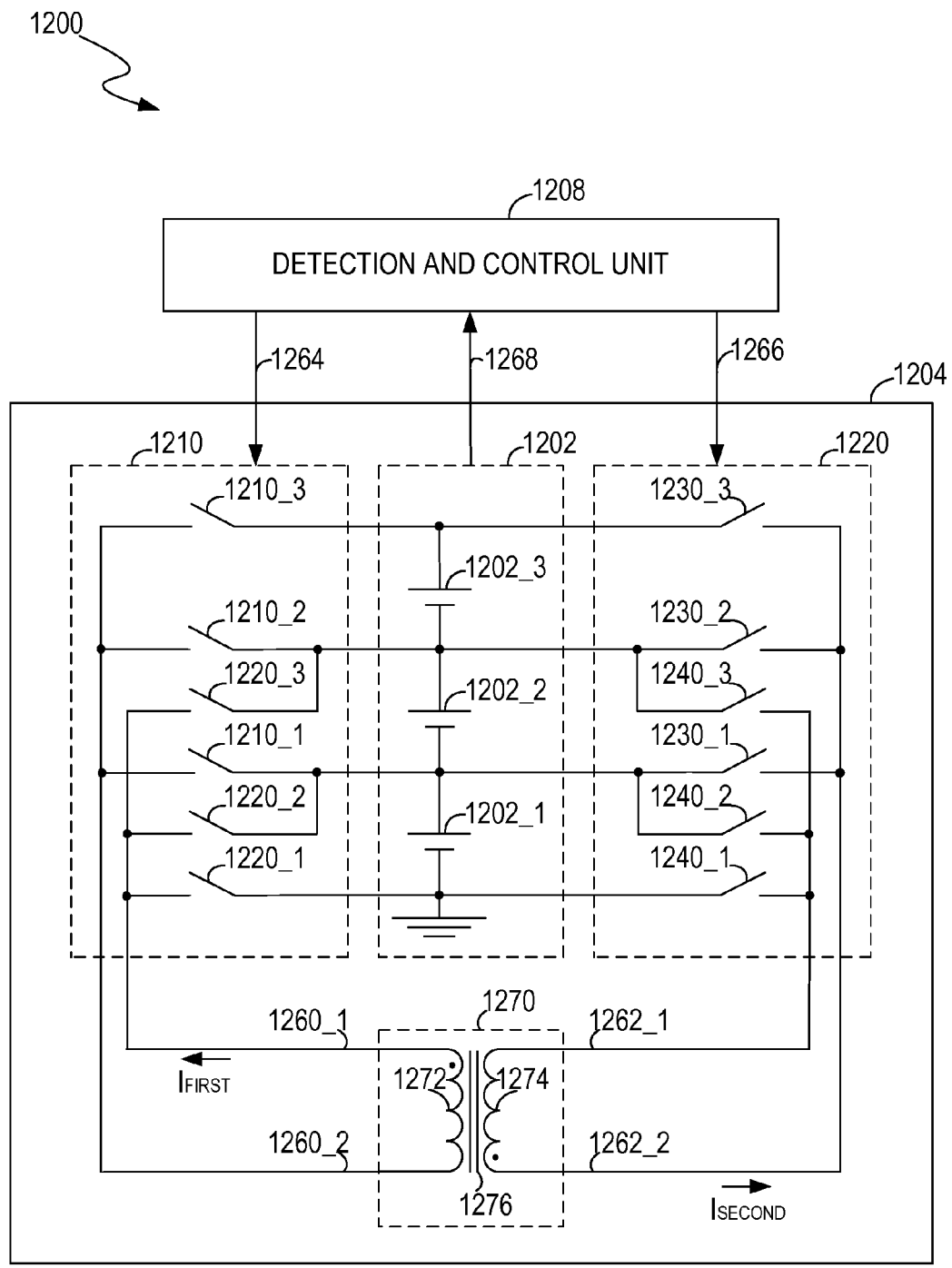
FIG. 12 illustrates another diagram of a battery management system, in accordance with one embodiment of the present invention.

FIG. 12 illustrates another diagram of a battery management system 1200, in accordance with one embodiment of the present invention. The battery management system 1200 includes a conversion circuit 1204 and a detection and control unit 1208. In one embodiment, the conversion circuit 1204 includes a battery pack 1202 having multiple battery cells 1202_1, 1202_2 and 1202_3 coupled in series. Alternatively, the battery pack 1202 can be outside the conversion circuit 1204.

The battery cells 1202_1-1202_3 in the battery pack 1202 can be, but are not limited to, LiIon/Polymer cells, Lead-Acid cells, NiCD/NiMH cells or super capacitors. Three battery cells are shown in the example of FIG. 12 for illustrative purposes. Other numbers of battery cells can be included in the battery pack 1202. Each battery cell 1202_1-1202_3 has a cell parameter. The cell parameter can be, but is not limited to, a state of charge (SOC) of the battery cell, a cell voltage of the battery cell, or a capacity of the battery cell. In the following descriptions, the cell parameter refers to the SOC for illustrative purposes; however, other information, e.g., the cell voltage or the cell capacity, is also suitable for being used as the cell parameter in this invention.

In one embodiment, the battery cells contained in the battery pack 1202 are grouped into multiple battery modules. Each of the battery modules includes one or more battery cells. As each battery cell has an SOC value, each battery module has an average SOC value. In one embodiment, the detection and control unit 1208 stores module data indicating which cell belongs to which battery module.

In one embodiment, the detection and control unit 1208 detects the SOC values of the battery cells 1202_1-1202_3 by receiving multiple detection signals 1268 indicating attributes of the battery cells 1202_1-1202_3 such as cell voltages of the battery cells 1202_1-1202_3, a current flowing through the battery cells 1202_1-1202_3, and/or temperatures of the battery cells 1202_1-1202_3. Based upon the detection signals 1268, the detection and control unit 1208 obtains values of SOCs of the battery cells 1202_1-1202_3. Accordingly, the detection and control unit 1208 further calculates the average SOC value for each battery module.

If the battery cells 1202_1-1202_3 are undergoing an unbalance condition, the detection and control unit 1208 identifies a donator module and a receiver module from the battery modules according to the average SOC value. More specifically, in one embodiment, the detection and control unit 1208 determines a donator group of battery modules and a receiver group of battery modules. The detection and control unit 1208 identifies a battery module from the donator group of battery modules as the donator module according to the average SOC value. For example, the donator module has a maximum average SOC value among the battery modules in the donator group. The donator module having the maximum average SOC value can also include a battery cell having a maximum SOC value. The detection and control unit 1208 also identifies a battery module from the receiver group of battery modules as the receiver module according to the average SOC value. For example, the receiver module has a minimum average SOC value among the battery modules in the receiver group. The receive module having the minimum average SOC value can also include a battery cell having a minimum SOC value. The identification operation of the detection and control unit 1208 is further described in relation to FIG. 14-FIG. 16.

In one embodiment, the detection and control unit 1208 generates a pair of switch control signals 1264 and 1266 according to a result of the identification of the donator module and receiver module. The conversion circuit 1204 receives the switch control signals 1264 and 1266 and transfers energy from the donator module to the receiver module accordingly to balance the battery cells 1202_1-1202_3.

Advantageously, the donator module or the receiver module includes one or more battery cells. As such, by transferring energy from the donator module to the receiver module, the cell balancing is achieved more efficiently. Moreover, since the energy can be transferred from the donator module having a maximum average SOC value to the receiver module having a minimum average SOC value, the efficiency of the cell balancing is further improved. In other words, upon completion of the cell balancing, the energy stored in the battery pack 1202 can be higher compared to the battery pack using traditional cell balancing methods. As such, the battery pack 1202 performs more energy efficient charge-discharge cycles than existing technology, which extends the rechargeable battery life and leads to the more efficient utilization and conservation of energy resources.

In the example of FIG. 12, the conversion circuit 1204 further includes a switch array 1210, a switch array 1220, and a converter 1270. The converter 1270 can be a flyback converter including a winding 1272 and a winding 1274 wiring around a magnetic core 1276.

The switch array 1210 includes multiple switches 1210_1, 1210_2, 1210_3, 1220_1, 1220_2 and 1220_3 which are coupled between the battery pack 1202 and the winding 1272 having terminals 1260_1 and 1260_2. For example, the switches 1210_1-1210_3 are coupled between the terminal 1260_2 and positive terminals of the battery cells 1202_1-1202_3, respectively. The switches 1220_1-1220_3 are coupled between the terminal 1260_1 and negative terminals of the battery cells 1202_1-1202_3, respectively.

Likewise, the switch array 1220 includes multiple switches 1230_1, 1230_2, 1230_3, 1240_1, 1240_2 and 1240_3 which are coupled between the battery pack 1202 and the winding 1274 having terminals 1262_1 and 1262_2. For example, the switches 1230_1-1230_3 are coupled between the terminal 1262_2 and positive terminals of the battery cells 1202_1-1202_3, respectively. The switches 1240_1-1240_3 are coupled between the terminal 1262_1 and negative terminals of the battery cells 1202_1-1202_3, respectively.

In one embodiment, the battery cells 1202_1-1202_3 are grouped into a first group of battery modules, each of which is controlled by the switch array 1210 to be coupled to/decoupled from the winding 1272 of the converter 1270. For example, by selectively turning on a switch from the switches 1210_1-1210_3 and a switch from the switches 1220_1-1220_3 and turning off the remaining switches in the switch array 1210, the first group of battery modules including {1202_1}, {1202_2}, {1202_3}, {1202_1, 1202_2}, {1202_2, 1202_3}, and {1202_1, 1202_2, 1202_3} can be coupled to the winding 1272 in parallel respectively. In the example of FIG. 12, the switch array 1210 and the switch array 1220 have the same configurations. As such, the battery cells 1202_1-1202_3 are grouped into the second group of battery modules including {1202_1}, {1202_2}, {1202_3}, {1202_1, 1202_2}, {1202_2, 1202_3}, and {1202_1, 1202_2, 1202_3}. Each of the second group of battery modules is controlled by the switch array 1220 to be coupled to/decoupled from the winding 1274 of the converter 1270.

The detection and control unit 1208 determines the donator group and the receiver group. In one embodiment, the donator group can include all the battery modules in one of the first and second groups or include all the battery modules in both the first and second groups. Alternatively, the donator group can include one or more battery modules selected from one of the first and second groups or selected from both the first and second groups, and each of the selected battery modules includes a battery cell having a maximum cell parameter among the battery cells 1202_1-1202_3. Likewise, the receiver group can include all the battery modules in one of the first and second groups or include all the battery modules in both the first and second groups. Alternatively, the receiver group can include one or more battery modules selected from one of the first and second groups or selected from both the first and second groups, and each of the selected battery modules includes a battery cell having a minimum cell parameter among the battery cells 1202_1-1202_3. The determination operation of the detection and control unit 1208 is further described in relation to FIG. 14-FIG. 16.

In one embodiment, a battery module having a maximum average SOC value among those in the donator group is identified as the donator module, and a battery module having a minimum average SOC value among those in the receiver group is identified as the receiver module.

When an unbalance condition occurs, the detection and control unit 1208 generates the switch control signals 1264 and 1266 based on the identification of the donator module and the receiver module. The switch arrays 1210 and 1220 receive the switch control signals 1264 and 1266, and turn on and off corresponding switches in the switch arrays 1210 and 1220 accordingly. As a result, the converter 1270 transfers energy from the donator module to the receiver module.

By way of example, assuming the battery module {1202_1} of the donator group is identified as the donator module, e.g., having a maximum average SOC value, and the battery module {1202_2, 1202_3} of the receiver group is identified as the receiver module, e.g., having a minimum average SOC value. In operation, the detection and control unit 1208 alternately turns on a switch set $S_{1210\_1-1220\_1}$ and a switch set $S_{1230\_3-1240\_2}$, where $S_{1210\_1-1220\_1}$ includes switches 1210_1 and 1220_1, and $S_{1230\_3-1240\_2}$ includes switches 1230_3 and 1240_2. When $S_{1210\_1-1220\_1}$ is turned on and $S_{1230\_3-1240\_2}$ is turned off, a current $I_{FIRST}$ is generated to flow from the battery cell 1202_1 to the winding 1272 and thus energy is transferred from {1202_1} to the core 1276. When $S_{1210\_1-1220\_1}$ is turned off and $S_{1230\_3-1240\_2}$ is turned on, a current $I_{SECOND}$ is generated to flow from the winding 1274 to the battery cells 1202_2 and 1202_3, and thus the energy stored in the core 1276 is delivered to {1202_2, 1202_3}. As a result, the energy of donator module {1202_1} is transferred to the receiver module {1202_2, 1202_3} to achieve cell balancing. The converter 1270 can include other components such as a boost converter, a buck converter, or a boost-buck converter, and is not limited to the example of FIG. 12.

Figure 13:
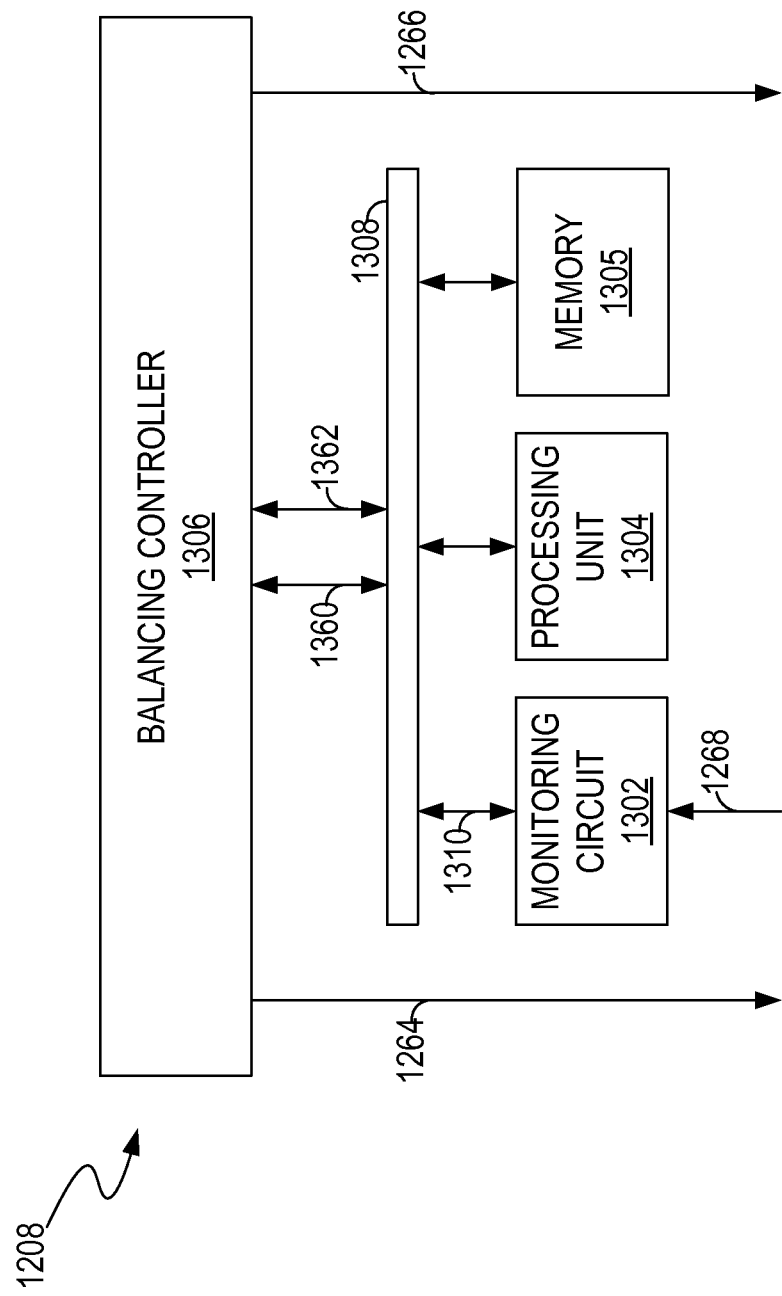
FIG. 13 illustrates an example of the detection and control unit, in accordance with one embodiment of the present invention.

FIG. 13 illustrates an example of the detection and control unit 1208, in accordance with one embodiment of the present invention. Elements labeled the same as in FIG. 12 have similar functions. FIG. 13 is described in combination with FIG. 12. In the example of FIG. 13, the detection and control unit 1208 includes a monitoring circuit 1302, a processing unit 1304, memory 1305, a balancing controller 1306, and a bus 1308. The bus 1308 is operable for interconnecting the components within the detection and control unit 1208.

In one embodiment, the monitoring circuit 1302 is configured to receive the detection signals 1268. The detection signals 1268 can include multiple voltage detection signals indicating cell voltages of the battery cells 1202_1-1202_3, a current detection signal indicating a current $I_{CELL}$ flowing through the battery cells 1202_1-1202_3, and/or temperature detection signals indicating temperatures of the battery cells 1202_1-1202_3. Moreover, the monitoring circuit 1302 further converts the detection signals 1268 to multiple digital detection signals 1310, which are transferred to the processing unit 1304 via the bus 1308, in one embodiment.

The processing unit 1304 can be a central processing unit (CPU), a microprocessor, a digital signal processing unit, or any other such device that can read and execute programming instructions. The processing unit 1304 executes machine-executable instructions stored in the memory 1305 to perform various operations. Moreover, the memory 1305 stores machine-readable data such as capacity data and the module data, in one embodiment. The capacity data indicates a full capacity $C_{FULL}$ of each battery cell during the last charging and discharging cycle, in one embodiment. The module data includes data indicating which battery cell belongs to which battery module and data indicating which battery modules belong to the first and second groups.

In one embodiment, by executing the machine-executable instructions, the processing unit 1304 calculates the SOC values of the battery cells 1202_1-1202_3 based on the digital detection signals 1310. More specifically, in one embodiment, the processing unit 1304 performs a coulomb count on the current $I_{CELL}$ to obtain a current charge capacity $C_{CURRENT}$ of a battery cell, and reads the capacity data from the memory 1305 to obtain the full capacity $C_{FULL}$ of the battery cell during the last charging and discharging cycle. As such, the SOC value of the battery cell is obtained in equation (1):

$$SOC=(C_{CURRENT}/C_{FULL})*100\% \qquad (1).$$

In one embodiment, the cell voltage and the temperature of the battery cell can be used to calibrate the calculated result of the SOC. The processing unit 1304 can employ other methods to obtain the SOC values of the battery cells 1202_1-1202_3, and is not limited to the example of FIG. 15.

Based on the calculated SOC values, the processing unit 1304 determines whether the battery cells 1202_1-1202_3 are undergoing an unbalance condition. During a charging process, the processing unit 1304 compares a maximum SOC value $SOC_{MAX}$ of the battery cells 1202_1-1202_3 with a predetermined high threshold $SOC_{TH\_H}$ to determine whether the battery cells are about to be fully charged, in one embodiment. In one embodiment, if $SOC_{MAX}$ is greater than $SOC_{TH\_H}$, which indicates that the battery cells will be fully charged in a relatively short time period, the processing unit 1304 begins to check the unbalance state of the battery cells by comparing a difference between $SOC_{MAX}$ and the minimum SOC value $SOC_{MIN}$ of the battery cells 1202_1-1202_3 with an unbalance threshold $SOC_{TH\_UNBAL}$. If the difference is less than $SOC_{TH\_UNBAL}$, no cell balancing is performed. If, however, the difference is greater than $SOC_{TH\_UNBAL}$, it indicates the battery cells are undergoing an unbalance state. As such, the processing unit 1304 reads the module data indicating which battery modules belong to the first group and the second group. As mentioned in relation to FIG. 12, the processing unit 1304 identifies the donator module and the receiver module according to the average SOC values of the battery modules. Accordingly, the processing unit 1304 generates a control command 1360. The balancing controller 1306 receives the control command 1360 and generates the switch control signals 1264 and 1266 accordingly to balance the battery cells. Advantageously, the battery cells 1202_1-1202_3 can stay in a balance condition when the charging process is completed (e.g., all the battery cells can be fully charged).

During a discharging process, the processing unit 1304 checks the unbalance condition if the minimum SOC value $SOC_{MIN}$ is less than a predetermined low threshold $SOC_{TH\_L}$, which indicates that the battery cells will be fully discharged in a relatively short time period, in one embodiment. The processing unit 1304 compares a difference between $SOC_{MAX}$ and $SOC_{MIN}$ with $SOC_{TH\_UNBAL}$. If the difference is less than $SOC_{TH\_UNBAL}$, no cell balancing is performed. If the difference is greater than $SOC_{TH\_UNBAL}$, it indicates the battery cells are undergoing an unbalance state. In this condition, the detection and control unit 1208 operates to balance the battery cells 1202_1-1202_3 in a manner similar to the cell balancing in the charging process. Advantageously, the battery cells 1202_1-1202_3 can stay in a balance condition when the discharging process is completed.

Figure 14:
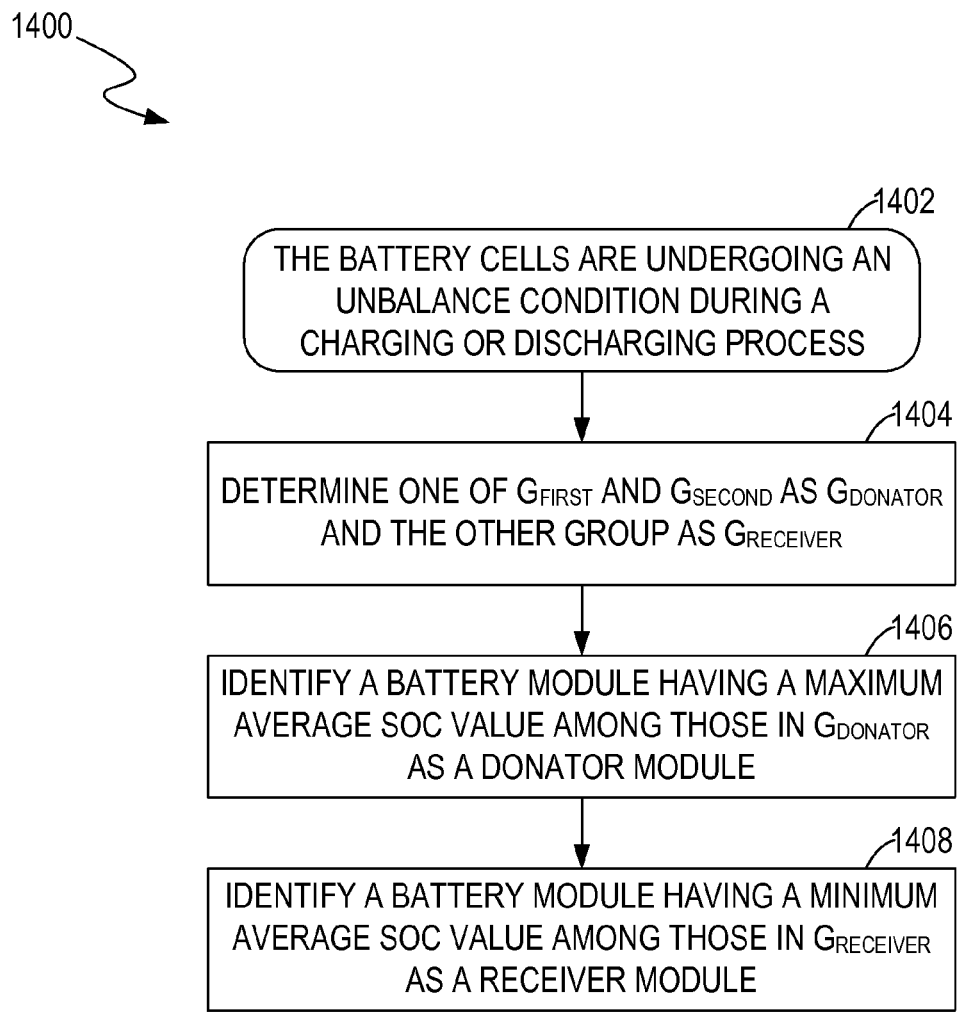
FIG. 14 illustrates a flowchart of operations performed by the processing unit during a charging or discharging process, in accordance with one embodiment of the present invention.

FIG. 14 illustrates a flowchart 1400 of operations performed by the processing unit 1304 during a charging or discharging process, in accordance with one embodiment of the present invention. More specifically, FIG. 14 shows an example of operations for identifying the donator module and the receiver module during the charging or discharging process. FIG. 14 is described in combination with FIG. 12 and FIG. 13.

At step 1402, the battery cells 1202_1-1202_3 are undergoing an unbalance condition during a charging or discharging process. Table 1 shows an example of SOC values of the battery cells 1202_1-1202_3 during a charging process. Since a difference between the maximum SOC value and the minimum SOC value, e.g., 71%-67%=4%, is greater than $SOC_{TH\_UNBAL}$, e.g., 3%, it indicates the battery cells 1202_1-1202_3 are in an unbalance condition. Table 2 shows an example of average SOC values of the battery modules in the first and second groups.

TABLE 1

| CELL | 1202_1 | 1202_2 | 1202_3 |
|---|---|---|---|
| SOC | 67% | 67% | 71% |

TABLE 2

| | | | | |
|---|---|---|---|---|
| FIRST GROUP | BATTERY MODULE | {1202_1} | {1202_2} | {1202_3} |
| | AVERAGE SOC | 67% | 67% | 71% |
| | BATTERY MODULE | {1202_1, 1202_2} | {1202_2, 1202_3} | {1202_1, 1202_2, 1202_3} |
| | AVERAGE SOC | 67% | 69% | 68.3% |
| SECOND GROUP | BATTERY MODULE | {1202_1} | {1202_2} | {1202_3} |
| | AVERAGE SOC | 67% | 67% | 71% |
| | BATTERY MODULE | {1202_1, 1202_2} | {1202_2, 1202_3} | {1202_1, 1202_2, 1202_3} |
| | AVERAGE SOC | 67% | 69% | 68.3% |

At step 1404, one of the first group $G_{FIRST}$ and second group $G_{SECOND}$ is identified as a donator group and the other group as a receiver group, in one embodiment. As shown in the example of table 2, the first and second groups contain the same battery modules. Thus, either the first group $G_{FIRST}$ or the second group $G_{SECOND}$ can be predetermined as the donator group $G_{DONATOR}$, e.g., by users. If the first group $G_{FIRST}$ is identified as the donator group $G_{DONATOR}$, the second group is identified as the receiver group $G_{RECEIVER}$. In other words, the donator group $G_{DONATOR}$ includes all the battery modules in the first group $G_{FIRST}$ and the receiver group $G_{RECEIVER}$ includes all the battery modules in the second group $G_{SECOND}$, in one such embodiment.

At step 1406, a battery module having a maximum average SOC value among those in the donator group $G_{DONATOR}$ is identified as the donator module. According to Table 2, {1202_3} in the first group $G_{FIRST}$ can be the donator module.

At step 1408, a battery module having a minimum average SOC value among those in the receiver group $G_{RECEIVER}$ is identified as the receiver module. According to Table 2, {1202_1}, {1202_2} or {1202_1, 1202_2} in the second group $G_{SECOND}$ can be the receiver module.

Figure 15:
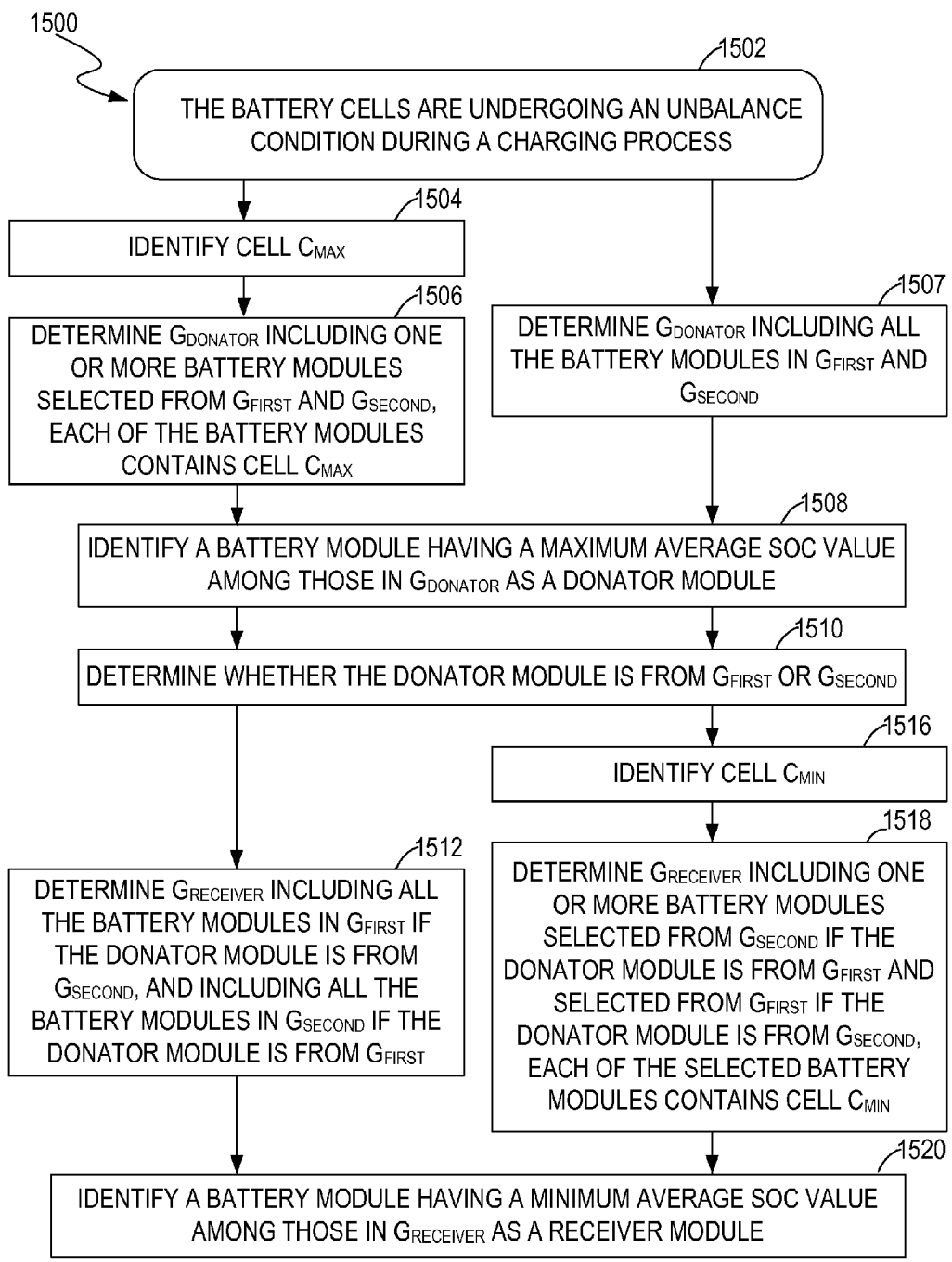
FIG. 15 illustrates a flowchart of operations performed by the processing unit during a charging process, in accordance with one embodiment of the present invention.

FIG. 15 illustrates a flowchart 1500 of operations performed by the processing unit 1304 during a charging process, in accordance with one embodiment of the present invention. More specifically, FIG. 15 shows an example of identifying the donator module and the receiver module during the charging process. For example, the processing unit 1304 performs operations described at steps 1504, 1506 and 1508 or steps 1507 and 1508 to identify the donator module and performs operations described at steps 1512 and 1520 or steps 1516, 1518 and 1520 to identify the receiver module. FIG. 15 is described in combination with FIG. 12, FIG. 13 and FIG. 14, and the example presented by the Table 1 and Table 2.

At step 1502, the battery cells 1202_1-1202_3 are undergoing an unbalance condition during a charging process. The flowchart 1500 goes to steps 1504 and 1506 or step 1507 to identify the donator group $G_{DONATOR}$ and further goes to step 1508 to identify the donator module.

At step 1504, a battery cell $C_{MAX}$ having a maximum SOC value among the battery cells 1202_1-1202_3 is identified. Based on Table 1, the cell 1202_3 is identified. At step 1506, the donator group $G_{DONATOR}$, which includes one or more battery modules selected from the first group $G_{FIRST}$ and the second group $G_{SECOND}$, is determined. Each of the selected battery modules contains the battery cell $C_{MAX}$. Based on table 2, the donator group $G_{DONATOR}$ includes the battery modules {1202_3}, {1202_2, 1202_3} and {1202_1, 1202_2, 1202_3}. At step 1508, a battery module having a maximum average SOC value among those in the donator group $G_{DONATOR}$ is identified as a donator module. According to table 2, the donator module can be {1202_3}. Then, the flowchart 1500 goes to the step 1510.

Advantageously, by selecting the donator module including the battery cell having the maximum SOC value during the charging process, the energy of the battery cell having the maximum SOC value can be enforced to be decreased. Thus, the reliability of the cell balancing is further improved.

In an alternative embodiment, at step 1507, the donator group $G_{DONATOR}$, which includes all the battery modules in the first group $G_{FIRST}$ and the second group $G_{SECOND}$, is determined. At this step, the donator group $G_{DONATOR}$ includes {1202_1}, {1202_2}, {1202_3}, {1202_1, 1202_2}, {1202_1, 1202_3}, {1202_2, 1202_3}, and {1202_1, 1202_2, 1202_3}. At step 1508, a battery module having a maximum average SOC value among those in the donator group $G_{DONATOR}$ is identified as the donator module. Thus, the battery module {1202_3} can be identified as the donator module according to Table 2. Then, the flowchart 1500 goes to the step 1510.

At step 1510, whether the donator module is from the first group $G_{FIRST}$ or the second group $G_{SECOND}$ is determined. Then, the flowchart 1500 goes to step 1512 or steps 1516 and 1518 to determine the receiver group $G_{RECEIVER}$ and further goes to step 1520 to identify the receiver module.

At step 1512, in one embodiment, the receiver group $G_{RECEIVER}$, which includes all the battery modules in the first group $G_{FIRST}$ if the donator module is from the second group $G_{SECOND}$ and includes all the battery modules in the second group $G_{SECOND}$ if the donator module is from the first group $G_{FIRST}$, is determined. In one embodiment, the donator module {1202_3} is from the first group $G_{FIRST}$. Thus, the receiver group $G_{RECEIVER}$ includes all the battery modules in the second group $G_{SECOND}$. Alternatively, the donator module {1202_3} is from the second group $G_{SECOND}$, and thus the receiver group $G_{RECEIVER}$ includes all the battery modules in the first group $G_{FIRST}$. At step 1520, a battery module having a minimum average SOC value among those in the receiver group $G_{RECEIVER}$ is identified as the receiver module. According to Table 2, {1202_1}, {1202_2} or {1202_1, 1202_2} can be the receiver module.

In an alternative embodiment, at step 1516, a battery cell $C_{MIN}$ having a minimum SOC value among the battery cells 1202_1-1202_3 is identified. Based on Table 1, the cell 1202_1 or 1202_2 is identified. At step 1518, the receiver group $G_{RECEIVER}$ including one or more battery modules, each of which includes the battery cell $C_{MIN}$, is determined. The battery modules of the receiver group $G_{RECEIVER}$ are selected from the first group $G_{FIRST}$ if the donator module is from the second group $G_{SECOND}$, and is selected from the second group $G_{SECOND}$ if the donator module is from the first group $G_{FIRST}$. Based on Table 2, the receiver group $G_{RECEIVER}$ includes the battery modules {1202_1}, {1202_2}, {1202_1, 1202_3}, {1202_1, 1202_2}, {1202_2, 1202_3} and {1202_1, 1202_2, 1202_3}. At step 1520, a battery module having a minimum average SOC value among those in the receiver group $G_{RECEIVER}$ is identified as a receiver module. According to Table 2, the receiver module can be {1202_1}, {1202_2} or {1202_1, 1202_2}.

Figure 16:
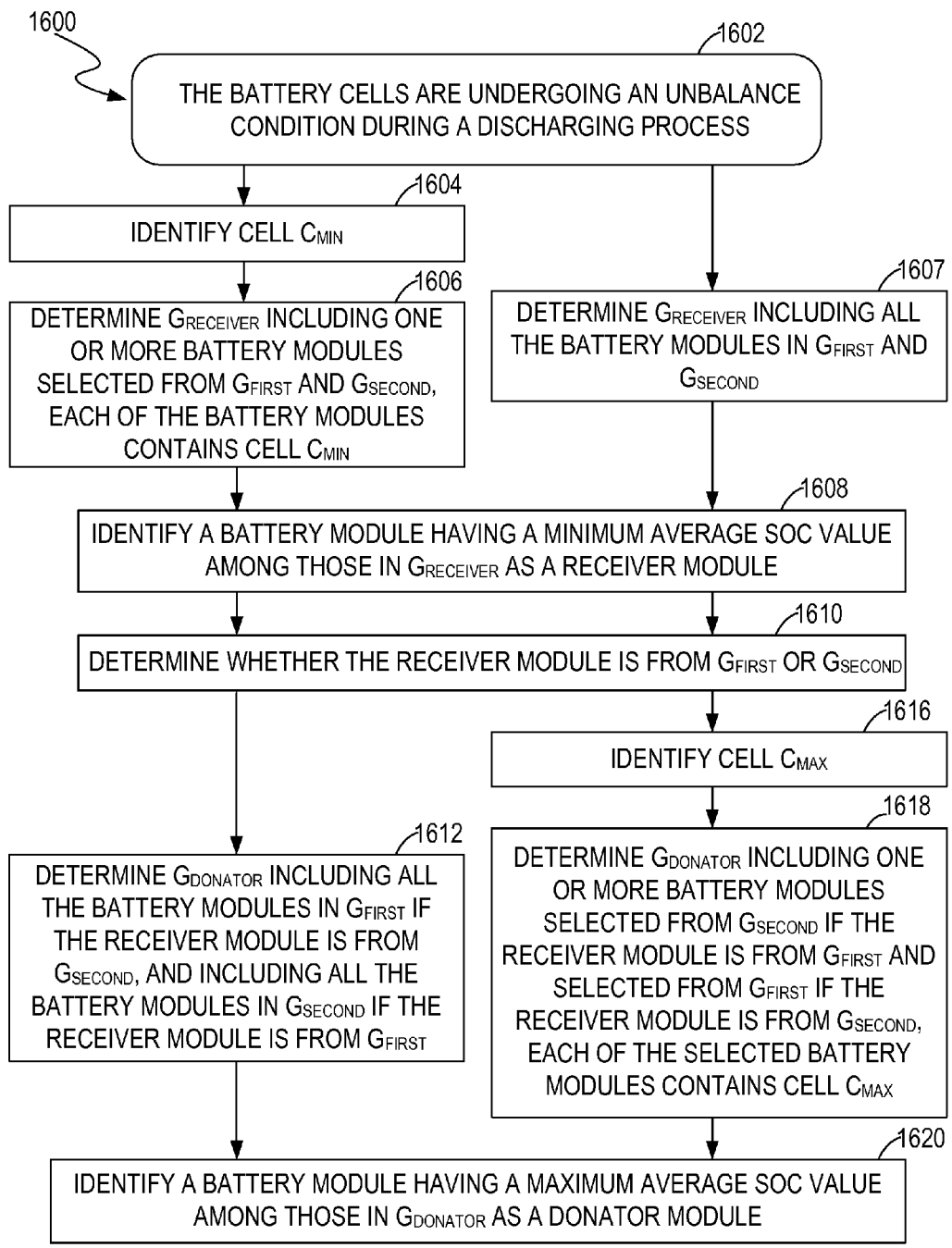
FIG. 16 illustrates another flowchart of operations performed by the processing unit during a discharging process, in accordance with one embodiment of the present invention

FIG. 16 illustrates a flowchart 1600 of operations performed by the processing unit 1304 during a discharging process, in accordance with one embodiment of the present invention. More specifically, FIG. 16 shows an example of identifying the donator module and the receiver module during the discharging process. For example, the processing unit 1304 performs operations described at steps 1604, 1606 and 1608 or steps 1607 and 1608 to identify the receiver module and performs operations described at steps 1612 and 1620 or steps 1616, 1618 and 1620 to identify the donator module. FIG. 16 is described in combination with FIG. 12-FIG. 15.

At step 1602, the battery cells 1202_1-1202_3 are undergoing an unbalance condition during a discharging process. The flowchart 1600 goes to steps 1604 and 1606 or step 1607 to determine the receiver group $G_{RECEIVER}$ and further goes to step 1608 to identify the receiver module.

At step 1604, a battery cell $C_{MIN}$ having a minimum SOC value among the battery cells 1202_1-1202_3 is identified. At step 1606, the receiver group $G_{RECEIVER}$, which includes one or more battery modules selected from the first group $G_{FIRST}$ and the second group $G_{SECOND}$, is determined. Each of the selected battery modules contains the battery cell $C_{MIN}$. At step 1608, a battery module having a minimum average SOC value among those in the receiver group $G_{RECEIVER}$ is identified as a receiver module. Then, the flowchart 1600 goes to the step 1610.

Advantageously, by selecting the receiver module including the battery cell having the minimum SOC value during the discharging process, the energy of the battery cell having the minimum SOC value can be enforced to be increased. Thus, the reliability of the cell balancing is further improved.

In an alternative embodiment, at step 1607, the receiver group $G_{RECEIVER}$, which includes all the battery modules in the first group $G_{FIRST}$ and the second group $G_{SECOND}$, is determined. At step 1608, a battery module having a minimum average SOC value among those in the receiver group $G_{RECEIVER}$ is identified as the receiver module. Then, the flowchart 1600 goes to the step 1610.

At step 1610, whether the receiver module is from the first group $G_{FIRST}$ or the second group $G_{SECOND}$ is determined. Then, the flowchart 1600 goes to step 1612 or steps 1616 and 1618 to determine the donator group $G_{DONATOR}$ and further goes to step 1620 to identify the receiver module.

At step 1612, in one embodiment, the donator group $G_{DONATOR}$, which includes all the battery modules in the first group $G_{FIRST}$ if the receiver module is from the second group $G_{SECOND}$ and includes all the battery modules in the second group $G_{SECOND}$ if the receiver module is from the first group $G_{FIRST}$, is determined. At step 1620, a battery module having a maximum average SOC value among those in the donator group $G_{DONATOR}$ is identified as the donator module.

In an alternative embodiment, at step 1616, a battery cell $C_{MAX}$ having a maximum SOC value among the battery cells 1202_1-1202_3 is identified. At step 1618, the donator group $G_{DONATOR}$ including one or more battery modules, each of which includes the battery cell $C_{MAX}$, is determined. The battery modules of the donator group $G_{DONATOR}$ are selected from the first group $G_{FIRST}$ if the receiver module is from the second group $G_{SECOND}$, and is selected from the second group $G_{SECOND}$ if the receiver module is from the first group $G_{FIRST}$. At step 1620, a battery module having a maximum average SOC value among those in the donator group $G_{DONATOR}$ is identified as a donator module. The detection and control unit 1208 can perform other operations to identify the donator module and the receiver module within the scope of the claims, and is not limited to the example in FIG. 14-FIG. 16.

In one embodiment, the cell balancing operation is terminated if there is an abnormal condition to prevent the battery cells from being damaged. Referring back to FIG. 12 and FIG. 13, by way of example, the switches in the switch arrays 1210 and 1220 can be metal-oxide semiconductor (MOS) transistors. If one or more transistors are broken down, e.g., because of aging of the transistors, the cell balancing operation is terminated in such abnormal condition. In one embodiment, the processing unit 1304 controls termination of the cell balancing operation according to a difference between the maximum SOC value and the minimum SOC value of the battery cells. More specifically, the processing unit 1304 calculates a value $D_{MAX-MIN1}$ of the difference between the maximum SOC value and the minimum SOC value, e.g., at time T0. When the conversion circuit 1204 balances the battery cells 1202_1-1202_3 for a predetermined time period T after time T0, the processing unit 1304 recalculates a value $D_{MAX-MIN2}$ of the difference between the maximum SOC value and the minimum SOC value. The processing unit 1304 compares $D_{MAX-MIN1}$ to $D_{MAX-MIN2}$. In one embodiment, if $D_{MAX-MIN2}$ is greater than $D_{MAX-MIN1}$, it indicates an abnormal condition occurs, and the processing unit 1304 generates a termination command 1362 to terminate the cell balancing operation. For example, the balancing controller 1306 controls the switch control signals 1264 and 1266 to turn off all the switches within the switch array 1210 and the switch array 1220.

Figure 17:
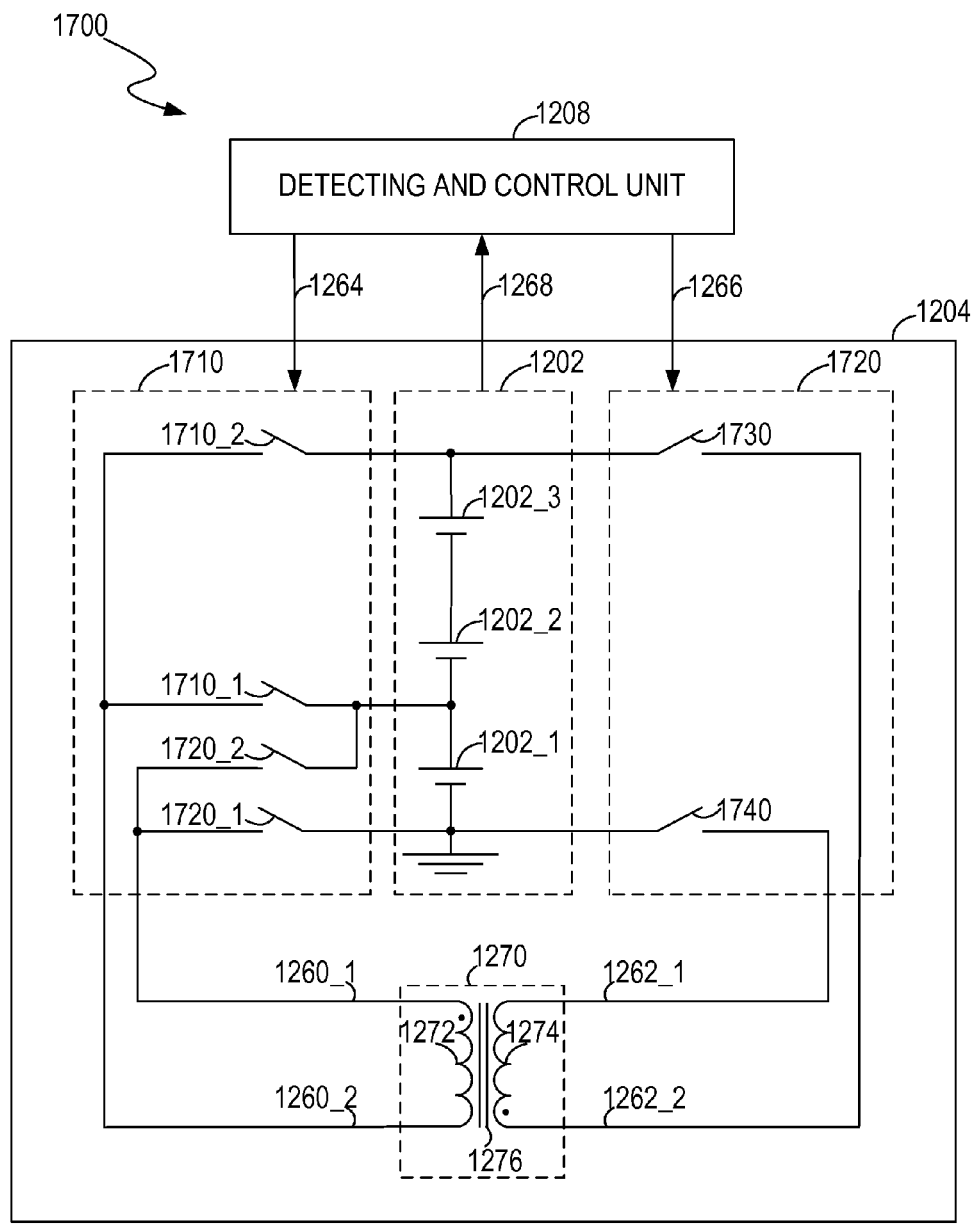
FIG. 17 illustrates another diagram of a battery management system, in accordance with one embodiment of the present invention.

FIG. 17 illustrates another diagram of a battery management system 1700, in accordance with one embodiment of the present invention. Elements labeled the same as in FIG. 12 have similar functions. FIG. 17 is described in combination with FIG. 12-FIG. 16.

In the example of FIG. 17, the detection circuit 1204 includes a switch array 1710 and a switch array 1720. The switch array 1710 has a different configuration from the switch array 1720. More specifically, the switch array 1710 includes multiple switches 1710_1, 1710_2, 1720_1 and 1720_2 which are coupled between the battery pack 1202 and the winding 1272. For example, the switches 1710_1 and 1710_2 are coupled between the terminal 1260_2 and positive terminals of the battery cells 1202_1 and 1202_3, respectively. The switches 1720_1 and 1720_2 are coupled between the terminal 1260_1 and negative terminals of the battery cells 1202_1 and 1202_2, respectively.

The switch array 1720 includes multiple switches 1730 and 1740 which are coupled between the battery pack 1202 and the winding 1274. For example, the switch 1730 is coupled between the terminal 1262_2 and the positive terminal of the battery cell 1202_3. The switch 1740 is coupled between the terminal 1262_1 and the negative terminal of the battery cell 1202_1.

Based on the configurations of the switch array 1710, the battery cells 1202_1-1202_3 are grouped into multiple battery modules belonging to a first group. For example, the first group can include battery modules {1202_1}, {1202_2, 1202_3}, {1202_1, 1202_2, 1202_3}. Likewise, based on the configurations of the switch array 1720, the battery cells 1202_1-1202_3 are grouped into one or more battery module belonging to a second group. For example, the second group includes one battery module {1202_1, 1202_2, 1202_3}.

As discussed above in relation to FIG. 12-FIG. 16, the detection and control unit 1208 identifies a donator module and a receiver module from the battery modules and generates the switch control signals 1264 and 1266 to control the switch arrays 1710 and 1720. As such, energy can be transferred from the donator module to the receiver module to achieve the cell balancing.

Advantageously, by decreasing the number of the switches in the switch arrays 1710 and 1720, the cost of the battery management system is decreased. Moreover, the switch arrays can have other configurations, and the balancing methods shown in relation to FIG. 12-FIG. 16 are adaptable to different configurations of the switch arrays. As such, the flexibility of the battery management system is improved.

Figure 18:
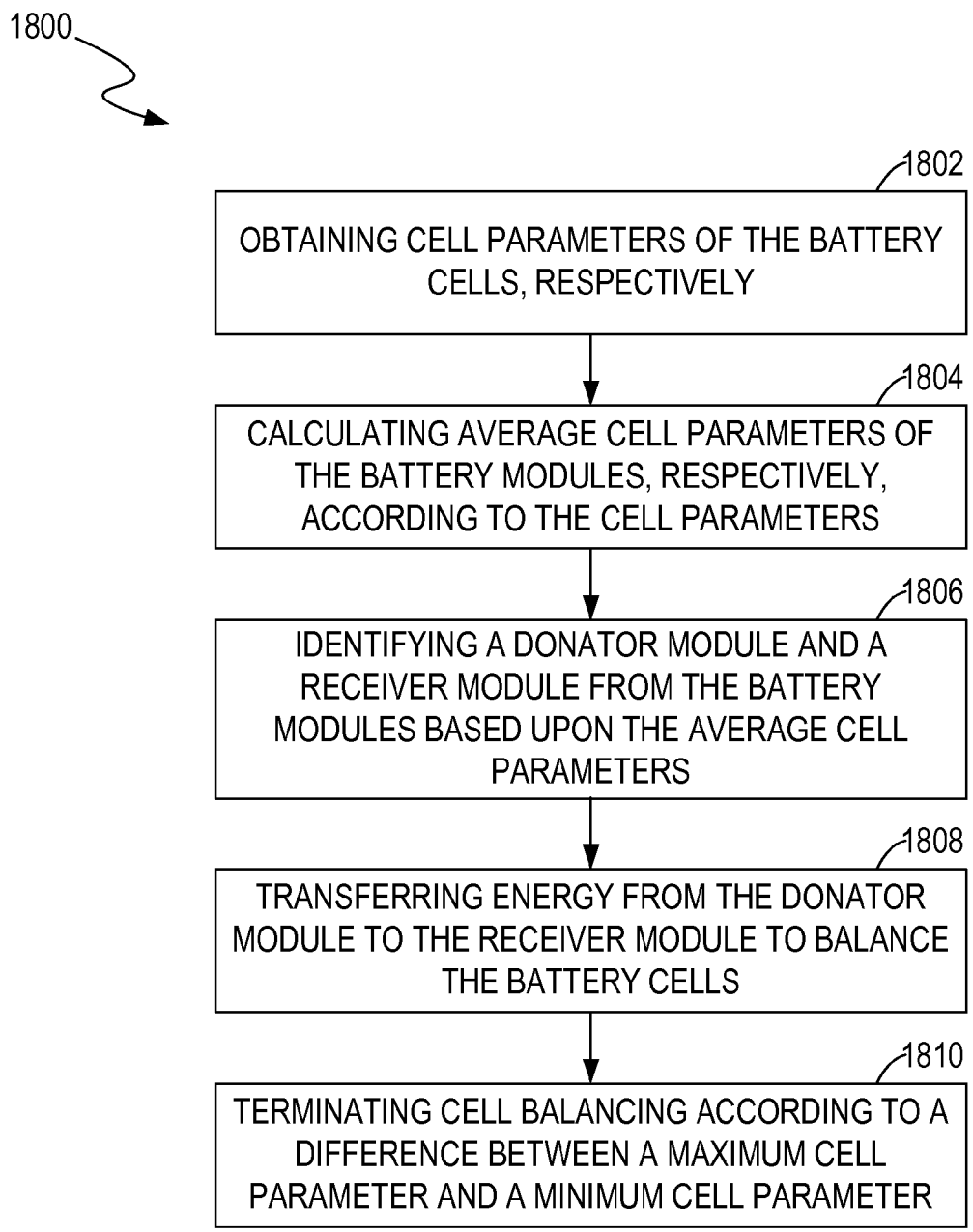
FIG. 18 illustrates another flowchart of operations performed by a battery management system, in accordance with one embodiment of the present invention.

FIG. 18 illustrates another flowchart 1800 of operations performed by a battery management system, in accordance with one embodiment of the present invention. FIG. 18 is described in combination with FIG. 1-FIG. 17. Although specific steps are disclosed in FIG. 18, such steps are examples. That is, the present invention is well suited to performing various other steps or variations of the steps recited in FIG. 18.

In block 1802, cell parameters, e.g., SOC values, of multiple battery cells, e.g., the battery cells 1202_1-1202_3, are obtained. In block 1804, an average cell parameter, e.g., an average SOC value, for each of the battery modules are calculated. In block 1806, a donator module and a receiver module is identified from the battery modules based on the average cell parameter. In block 1808, energy is transferred from the donator module to the receiver module to balance the battery cells. In block 1810, cell balancing is terminated based upon a difference between a maximum cell parameter and a minimum cell parameter.

Embodiments in accordance with the present disclosure provide systems and methods for balancing battery cells. The battery cells are grouped into battery modules. Based upon the average parameters of the battery modules, a receiver module and a donator module are identified from the battery modules. The cell balancing is achieved by transferring energy from the donator module to the receiver module. Advantageously, the donator module and the receiver module can include one or more battery cells. As such, by transferring energy from the donator module to the receiver module, the cell balancing is achieved more efficiently. Moreover, since the energy can be transferred from the donator module having a maximum average SOC value to the receiver module having a minimum average SOC value, the efficiency of the cell balancing is further improved. In other words, upon completion of the cell balancing, the energy stored in the battery pack 1202 can be higher compared to the battery pack using traditional cell balancing methods. As such, the battery pack 1202 performs more energy efficient charge-discharge cycles than existing technology, which extends the rechargeable battery life and leads to the more efficient utilization and conservation of energy resources.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A method for balancing a battery pack comprising a plurality of battery cells, wherein said method comprises:

accessing a plurality of cell parameters of said plurality of battery cells, wherein said battery cells are logically grouped into a plurality of battery modules that comprise a first battery module including a first number of battery cells and comprise a second battery module including a second number of battery cells, said second number different from said first number;

averaging cell parameters of battery cells in each of said battery modules to obtain an average cell parameter for each of said battery modules;

determining a donator group of battery modules and a receiver group of battery modules from said plurality of battery modules;

identifying a battery module having the maximum average cell parameter among said donator group of battery modules as a donator module;

identifying a battery module having the minimum average cell parameter among said receiver group of battery modules as a receiver module;

transferring energy from said donator module to said receiver module to balance battery cells in said battery pack;

determining a first group of battery modules among said plurality of battery modules according to configurations of a first switch array coupled to said plurality of battery cells; and determining a second group of battery modules among said plurality of battery modules according to configurations of a second switch array coupled to said plurality of battery cells, wherein said donator group of battery modules includes said first and second groups.

2. The method as claimed in claim 1, further comprising:

identifying the maximum cell parameter of said plurality of cell parameters, wherein each battery module in said donator group comprises a battery cell having said maximum cell parameter.

3. The method as claimed in claim 1, further comprising:
identifying the minimum cell parameter of said plurality of cell parameters,
wherein each battery module in said receiver group comprises a battery cell having said minimum cell parameter.

4. The method as claimed in claim 1, further comprising:
determining whether said donator module is selected from said first group or from said second group;
determining that said receiver group includes the battery modules in said first group if said donator module is selected from said second group; and
determining that said receiver group includes the battery modules in said second group if said donator module is selected from said first group.

5. The method as claimed in claim 1, further comprising:
identifying the minimum cell parameter of said plurality of cell parameters;
determining whether said donator module is selected from said first group or from said second group;
determining that said receiver group includes battery modules selected from said first group if said donator module is selected from said second group, wherein each of said selected battery modules from said first group comprises a battery cell having said minimum cell parameter; and
determining that said receiver group includes battery modules selected from said second group if said donator module is selected from said first group, wherein each of said selected battery modules from said second group comprises a battery cell having said minimum cell parameter.

6. The method as claimed in claim 1, wherein said plurality of battery cells comprise a first cell, a second cell and a third cell, wherein said battery modules comprise a first module having said first cell, a second module having said second cell, a third module having said third cell, a fourth module having said first and second cells, a fifth module having said second and third cells, and a sixth module having said first, second and third cells.

7. A system for balancing a plurality of battery cells which are grouped into a plurality of battery modules, said system comprising:
a detection and control unit operable for accessing a plurality of cell parameters of said plurality of battery cells, averaging cell parameters of battery cells in each of said battery modules to obtain an average cell parameter for each of said battery modules, selecting a donator group of battery modules and a receiver group of battery modules from said plurality of battery modules, identifying a battery module having the maximum average cell parameter among said donator group of battery modules as a donator module, identifying a battery module having the minimum average cell parameter among said receiver group of battery modules as a receiver module, and generating control signals, wherein said battery cells are logically grouped into said battery modules, said battery modules comprise a first battery module including a first number of battery cells and comprise a second battery module including a second number of battery cells, and said second number is different from said first number; and
a conversion, circuit coupled to said detection and control unit, operable for transferring energy from said donator module to said receiver module according to said control signals to balance said plurality of battery cells, wherein said conversion circuit comprises:
a first switch array coupled to said plurality of battery cells, wherein a first group of battery modules among said plurality of battery modules is determined according to configurations of said first switch array; and
a second switch array coupled to said plurality of battery cells, wherein a second group of battery modules among said plurality of battery modules is determined according to configurations of said second switch array,
wherein said donator group of battery modules includes the battery modules in said first and second groups.

8. The system as claimed in claim 7, wherein said detection and control unit comprises:
a processing unit operable for determining whether said donator module is selected from said first group or from said second group, for determining that said receiver group includes the battery modules in said first group if said donator module is selected from said second group, and for determining that said receiver group includes the battery modules in said second group if said donator module is selected from said first group.

9. The system as claimed in claim 7, wherein said detection and control unit comprises:
a processing unit operable for identifying the minimum cell parameter of said plurality of cell parameters, for determining whether said donator module is selected from said first group or from said second group, for determining that said receiver group includes battery modules in said first group if said donator module is selected from said second group, wherein each of said battery modules in said receiver group comprises a battery cell having said minimum cell parameter, and for determining that said receiver group includes battery modules in said second group if said donator module is selected from said first group, wherein each of said battery modules in said receiver group comprises a battery cell having said minimum cell parameter.

10. The system as claimed in claim 7, wherein said plurality of battery cells comprise a first cell, a second cell, and a third cell, wherein said battery modules comprise a first module having said first cell, a second module having said second cell, a third module having said third cell, a fourth module having said first and second cells, a fifth module having said second and third cells, and a sixth module having said first, second and third cells.

11. The method as claimed in claim 1, further comprising:
connecting said donator module to a first winding of a converter; and
subsequent to said connecting of said donator module to said first winding, disconnecting said donator module from said first winding and connecting said receiver module to a second winding of said converter.

12. The system as claimed in claim 7, wherein said conversion circuit comprises a first winding and a second winding, and wherein said detection and control unit connects said donator module to said first winding, and subsequent to the connecting of said donator module to said first winding, said detection and control unit disconnects said donator module from said first winding and connects said receiver module to said second winding.

13. A method for balancing a battery pack comprising a plurality of battery cells, wherein said method comprises:
accessing a plurality of cell parameters of said plurality of battery cells, wherein said battery cells are logically grouped into a plurality of battery modules that comprise a first battery module including a first number of battery cells and comprise a second battery module including a second number of battery cells, said second number different from said first number;

averaging cell parameters of battery cells in each of said battery modules to obtain an average cell parameter for each of said battery modules;

determining a donator group of battery modules and a receiver group of battery modules from said plurality of battery modules;

identifying a battery module having the maximum average cell parameter among said donator group of battery modules as a donator module;

identifying a battery module having the minimum average cell parameter among said receiver group of battery modules as a receiver module;

transferring energy from said donator module to said receiver module to balance battery cells in said battery pack;

determining a first group of battery modules among said plurality of battery modules according to configurations of a first switch array coupled to said plurality of battery cells; and determining a second group of battery modules among said plurality of battery modules according to configurations of a second switch array coupled to said plurality of battery cells, wherein said receiver group of battery modules includes the battery modules in said first and second groups.

14. The method as claimed in claim 13, further comprising:
determining whether said receiver module is selected from said first group or from said second group;
determining that said donator group includes the battery modules in said first group if said receiver module is selected from said second group; and
determining that said donator group includes the battery modules in said second group if said receiver module is selected from said first group.

15. The method as claimed in claim 13, further comprising:
identifying the maximum cell parameter of said plurality of cell parameters;
determining whether said receiver module is selected from said first group or from said second group;
determining that said donator group includes battery modules selected from said first group if said receiver module is selected from said second group, wherein each of said selected battery modules from said first group comprises a battery cell having said maximum cell parameter; and
determining that said donator group includes battery modules selected from said second group if said receiver module is selected from said first group, wherein each of said selected battery modules from said second group comprises a battery cell having said maximum cell parameter.

16. The method as claimed in claim 13, further comprising:
connecting said donator module to a first winding of a converter; and
subsequent to said connecting of said donator module to said first winding, disconnecting said donator module from said first winding and connecting said receiver module to a second winding of said converter.

17. A system for balancing a plurality of battery cells which are grouped into a plurality of battery modules, said system comprising:
a detection and control unit operable for accessing a plurality of cell parameters of said plurality of battery cells, averaging cell parameters of battery cells in each of said battery modules to obtain an average cell parameter for each of said battery modules, selecting a donator group of battery modules and a receiver group of battery modules from said plurality of battery modules, identifying a battery module having the maximum average cell parameter among said donator group of battery modules as a donator module, identifying a battery module having the minimum average cell parameter among said receiver group of battery modules as a receiver module, and generating control signals, wherein said battery cells are logically grouped into said battery modules, said battery modules comprise a first battery module including a first number of battery cells and comprise a second battery module including a second number of battery cells, and said second number is different from said first number; and a conversion, circuit coupled to said detection and control unit, operable for transferring energy from said donator module to said receiver module according to said control signals to balance said plurality of battery cells, wherein said detection and control unit comprises:
a first switch array coupled to said plurality of battery cells, wherein a first group of battery modules among said plurality of battery modules is determined according to configurations of said first switch array; and
a second switch array coupled to said plurality of battery cells, wherein a second group of battery modules among said plurality of battery modules is determined according to configurations of said second switch array,
wherein said receiver group of battery modules includes the battery modules in said first and second groups.

18. The system as claimed in claim 17, wherein said detection and control unit comprises:
a processing unit operable for determining whether said receiver module is selected from said first group or from said second group, for determining that said donator group includes the battery modules in said first group if said receiver module is selected from said second group, and for determining that said donator group includes the battery modules in said second group if said receiver module is selected from said first group.

19. The system as claimed in claim 17, wherein said detection and control unit comprises:
a processing unit operable for identifying the maximum cell parameter of said plurality of cell parameters, for determining whether said receiver module is selected from said first group or from said second group, for determining that said donator group includes the battery modules in said first group if said receiver module is selected from said second group, and for determining that said donator group includes the battery modules in said second group if said receiver module is selected from said first group, wherein each of said battery modules in said donator group comprises a battery cell having said maximum cell parameter.

20. The system as claimed in claim 17, wherein said conversion circuit comprises a first winding and a second winding, and wherein said detection and control unit connects said donator module to said first winding, and subsequent to the connecting of said donator module to said first winding, said detection and control unit disconnects said donator module from said first winding and connects said receiver module to said second winding.

* * * * *